(12) United States Patent
Hendrey

(10) Patent No.: US 9,165,074 B2
(45) Date of Patent: Oct. 20, 2015

(54) SYSTEMS AND METHODS FOR PERFORMING GEO-SEARCH AND RETRIEVAL OF ELECTRONIC POINT-OF-INTEREST RECORDS USING A BIG INDEX

(71) Applicant: Uber Technologies, Inc., San Francisco, CA (US)

(72) Inventor: Geoffrey Hendrey, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 13/690,856

(22) Filed: Nov. 30, 2012

(65) Prior Publication Data
US 2013/0198159 A1   Aug. 1, 2013

Related U.S. Application Data

(63) Continuation-in-part of application No. 13/468,979, filed on May 10, 2012.

(60) Provisional application No. 61/565,433, filed on Nov. 30, 2011, provisional application No. 61/484,298, filed on May 10, 2011.

(51) Int. Cl.
*G06F 17/30* (2006.01)

(52) U.S. Cl.
CPC ...... *G06F 17/30864* (2013.01); *G06F 17/3064* (2013.01); *G06F 17/3087* (2013.01)

(58) Field of Classification Search
CPC ...................... G06F 17/3064; G06F 17/30864
See application file for complete search history.

(56) References Cited

U.S. PATENT DOCUMENTS 8,037,075 B2 * 10/2011 Millett .......................... 707/741
8,301,650 B1 * 10/2012 Oliver ........................... 707/758

(Continued)

FOREIGN PATENT DOCUMENTS

EP          1 577 793 A2    9/2005
WO    WO 2010/060117 A1    5/2010

OTHER PUBLICATIONS

Bravo-Marquez et al., "Hypergeometric Language Model and Zipf-Like Scoring Function for Web Document Similarity Retrieval," *SPIRE 2010, LCNS 6393*, pp. 304-309 (2010).

(Continued)

*Primary Examiner* — Leslie Wong
(74) *Attorney, Agent, or Firm* — Fenwick & West LLP

(57) ABSTRACT

Methods and systems for providing a geo-search engine capability for large point-of-interest record datasets are disclosed. These methods and systems employ a Partition-by-Query index containing key-values pairs corresponding to keys reflecting concept-ordered geo-search phrases and values reflecting ordered lists of point-of-interest record references that are responsive to the concept-ordered geo-search phrase in a corresponding key. A large Partition-by-Query index may be partitioned across multiple servers depending on the size of the index, or the size of the index may be reduced by compressing query-references pairs into clusters. The methods and systems described herein may provide suggestions and spelling corrections to the user, thereby improving the user's geo-search engine experience while meeting user expectations for geo-search quality and responsiveness.

9 Claims, 19 Drawing Sheets

(56) References Cited

U.S. PATENT DOCUMENTS

| | | | | |
|---|---|---|---|---|
| 8,838,603 | B1* | 9/2014 | Djabarov et al. | 707/737 |
| 2004/0019584 | A1* | 1/2004 | Greening et al. | 707/1 |
| 2005/0138028 | A1 | 6/2005 | Liu et al. | |
| 2006/0167676 | A1* | 7/2006 | Plumb | 704/6 |
| 2007/0198495 | A1* | 8/2007 | Buron et al. | 707/3 |
| 2008/0177994 | A1* | 7/2008 | Mayer | 713/2 |
| 2012/0265744 | A1* | 10/2012 | Berkowitz et al. | 707/705 |
| 2013/0238584 | A1 | 9/2013 | Hendry | |

OTHER PUBLICATIONS

Christoforaki et al., "Text vs. Space: Efficient Geo-Search Query Processing," *CIKM '11* (20th ACM Conference on Information and Knowledge Management), Glasgow, Scotland, U.K., Oct. 24-28, 2011, pp. 423-432.

Codescu et al., "DO-ROAM: Activity-Oriented Search and Navigation with OpenStreetMap," Bremen, Germany, Jan. 1, 2010, pp. 1-20. Retrieved from the Internet: http://www.informatik.uni-bremen.de/~till/papers/do-roam.pdf.

Kung et al., "On Optimistic Methods for Concurrency Control," *ACM Transactions on Database Systems*, 6(2): 213-226 (1981).

Manning et al., "An Introduction to Information Retrieval," Online edition, Cambridge University Press, Cambridge, England, 581 pages (2009).

Prabhakar et al., "Query Indexing and Velocity Constrained Indexing: Scalable Techniques for Continuous Queries on Moving Objects," *IEEE Transactions on Computers*, 51(10): 1124-1140 (2002).

Salton et al., "A vector space model for automatic indexing," Communications of the ACM, 18(11): 613-620 (1975).

Wang et al., "Efficient Algorithms for Top-k Keyword Queries on Spatial Databases," *12th IEEE International Conference on Mobile Data Management*, Jun. 1, 2011, pp. 285-286.

Wang et al., "Selectivity Estimation for Extraction Operators over Text Data," *27th IEEE International Conference on Data Engineering*, Apr. 11-16, 2011, pp. 685-696.

PCT Notification of Transmittal of the International Search Report and Written Opinion of the International Searching Authority, or the Declaration, in International Application No. PCT/US2012/037384, mailed Dec. 4, 2012.

PCT Notification of Transmittal of the International Search Report and Written Opinion of the International Searching Authority, or the Declaration, in International Application No. PCT/US2012/067412, mailed Mar. 15, 2013.

Office Action mailed Oct. 1, 2013, for U.S. Appl. No. 13/468,979.

Response to Restriction Requirement filed Oct. 30, 2013, for U.S. Appl. No. 13/468,979.

* cited by examiner

SYSTEMS AND METHODS FOR PERFORMING GEO-SEARCH AND RETRIEVAL OF ELECTRONIC POINT-OF-INTEREST RECORDS USING A BIG INDEX

RELATED APPLICATION

This application is a continuation-in-part of U.S. patent application Ser. No. 13/468,979, filed May 10, 2012, which claims priority to U.S. Provisional Application 61/484,298, filed May 10, 2011, and also claims the benefit of U.S. Provisional Application 61/565,433, filed Nov. 30, 2011, all of which are incorporated herein in their entirety.

TECHNICAL FIELD

The present disclosure is directed to the field of information systems and, more particularly, to methods and systems for performing geographic-based information retrieval involving many point-of-interest records.

BACKGROUND

The Internet has become a popular tool for modern commerce and personal communication. This popularity can be attributed to many factors, including the ease with which people can use the Internet and the amount of information available on the Internet. As more information becomes available on the Internet, it will become even more difficult to locate and retrieve useful information unless search methods keep pace with the volume of information.

The popularity of the Internet has also led to development of search engines that retrieve specific types of data. Some search engines identify and/or retrieve documents based on a search query (e.g., "books on Marco Polo") directed to retrieving information from documents. Other search engines identify and/or retrieve location or destination information based on an input query (e.g., "pizza on Mission Street") directed to retrieving information from a point-of-interest database possibly based on relative proximity to a location. This latter type of retrieval is often termed "geo-searching" and results from such searches are often termed "geo-search results."

Search engines must balance accuracy with speed. Users expect that relevant search results will be delivered in seconds, although the amount of electronic data that is being searched is growing exponentially. Users also expect search engines to find the information desired by the user even if the user gives incorrect or incomplete information. Many existing search engines correct spelling mistakes, find approximate matches, or provide suggestions to the user, based either on the user's prior use or overall popularity of the information.

Existing search engines will face difficulties keeping pace with the growth in available searchable data because of the way they search information. Existing search engines typically operate by creating an index of available documents or information prior to receiving any search queries and by searching that index for user-provided terms in a search query upon receipt of that query. While this may work well with a small amount of data, it becomes impractical as the volume of data grows.

One problem that traditional geo-search engines struggle with is distinguishing between point-of-interest names and location strings within a geo-search query string. For example, if a user queries a geo-search engine with the string "chicago pizza", some traditional geo-search engines attempt to determine whether the user is requesting a geo-search result for pizza restaurants in Chicago or the user is requesting a geo-search result for a specific pizza restaurant named "Chicago Pizza." In the first scenario, the "Chicago" term would reflect location information while in the second scenario the "Chicago" term would be part of the point-of-interest name for that query. Some traditional geo-search engines avoid such ambiguities by providing one text entry box for inputting the point-of-interest's name and another text entry box for inputting its location. However, users find two-text-box solutions within a search engine inconvenient to use, so better solutions are needed.

Other problems that traditional geo-search engines struggle with are that users run words together by omitting spaces between words. An example of the problem would be the string "alamedadelaspulgas" as a replacement for the street name "Alameda de las Pulgas." Because mobile phone users tend to put a high value on convenience, a geo-search engine that can adapt to space omissions in geo-search queries is needed.

Mobile phone users often seek points of interest within close proximity of their present location. Therefore, a geo-search engine that prioritizes search results by proximity to the user's current location or a specific location is needed.

Traditional search engines operating on electronic documents often create an index using a two-step process. First, a "forward index" is created for each document in the corpus. A "forward index" consists of a unique ordered list of words within a document created by parsing each word in that document, removing redundant words, and associating those words with their corresponding documents. For a document-based example, the forward index for a first document (D1) containing the sentence "Sam I am" is "am, I, sam" while the forward index for a second document (D2) containing the sentence "I do not like green eggs and ham" is "and, do, eggs, green, ham, I, like, not." As shown in these examples, one document may be associated with many individual words.

Second, an "inverted index" for a corpus is formed by first reversing each association between a document and its list of words and then combining the documents associated with each word into a single list. A list of documents associated with a search term is referred to as a "posting list." In a document-based example, for a corpus containing documents D1 and D2 discussed above, the inverted index for the corpus would be: "and:D2", "do:D2", "eggs:D2", "green:D2", "ham:D2", "I:D1 & D2", "like:D2", "not:D2", and "sam:D1". Note that the word "I" is associated with documents D1 and D2 while all other words are associated with either document D1 or D2.

Traditional search engines identify documents responsive to a search query based on a union of the posting lists and prioritization of the results. For a document-based example, for a corpus containing D1 and D2, a search query for documents containing the word "sam" would return only document D1 because the inverted index only associates the word "sam" with document D1. Alternatively, a search for documents containing the phrase "do you like Sam" may return a prioritized search result of documents D2 and D1, reflecting that document D2 contains the words "do" and "like" and therefore may be more relevant, whereas document D1 only contained the word "sam".

An inverted index for a relatively small amount of data can be maintained in memory rather than being stored on disk or in a database, thereby allowing acceptable search performance. When a corpus is large, however, the data is partitioned across multiple machines in an order-preserving manner, a process known as "sharding". Conventional search engines indexing documents split the indices for a corpus by document, rather than splitting the indices by some other characteristic. Such split indices are referred to as "partition-by-document" indices. When partitioning in this manner, search queries must be broadcast to each machine, and the results from each machine are prioritized and combined, a time-consuming and slow process.

Traditional document-based search engines suffer from performance limitations not just from sharding, but also from the way information is retrieved. Traditional relational databases were designed to retrieve data structured in a consistent format and are not effective for storing or retrieving unstructured data, such as an inverted index. NoSQL is a key-value storage system of storing or retrieving data from very large data sets. NoSQL systems can store significant amounts of data and can perform key-value searches very quickly relative to other search systems, but cannot support inverted indexes efficiently using traditional search methods such as partition-by-document indexing.

Traditional geo-search engines suffer from the problems discussed above in conjunction with document-bases search engines and also suffer from additional problems specific to geo-searching. As discussed above, geo-search engines suffer from ambiguities between targets and points of interest, and they also involve prioritization of search results by geographic proximity. Therefore, traditional geo-search engines suffer from issues that document-based search engines suffer from in addition to suffering from issues that are specific to geo-search engines.

SUMMARY

Methods and systems for performing the following steps are disclosed: generating, by a computing device, a geo-search query index based on the set of electronic point-of-interest records, wherein the geo-search query index comprises a first set of key-value pairs, each key-value pair comprising a key and one or more reference values, each key comprising at least one token from an expected geo-search query generated based on the set of electronic point-of-interest records, and each reference value corresponding to a point-of-interest record associated with the at least one token; parsing, by the computing device, a geo-search query from a computer user into at least one token; generating, by the computing device, an ordered geo-search query from the parsed geo-search query comprising tokens ordered by increasing frequency within the set of electronic point-of-interest records; and providing, by the computing device, point-of-interest record references responsive to the geo-search query by the computer user based on the ordered geo-search query and the geo-search query index.

Methods and systems are also disclosed for creating a geo-search query index configured to store point-of-interest record references responsive to a plurality of expected geo-search queries, the method comprising: generating, by a computing device, a first plurality of expected geo-search queries from an electronic point-of-interest record in a set of electronic point-of-interest records based at least in part on tokens parsed from the electronic point-of-interest record; determining, by the computing device, relevance of each expected geo-search query to the electronic point-of-interest record; selecting, by the computing device, a second plurality of expected geo-search queries for each electronic point-of-interest record from the first plurality of expected geo-search queries for that electronic point-of-interest record based at least in part on the relevance of each expected geo-search query in the second plurality of expected geo-search queries to that electronic point-of-interest record; and performing, by the computing device, the following steps for each expected geo-search query in the second plurality of expected geo-search queries: ordering tokens in the expected geo-search query by decreasing relevance to form an ordered expected geo-search query; and creating a plurality of document point-of-interest record, wherein the plurality of document point-of-interest record includes a reference to the electronic point-of-interest record and at least one reference to another point-of-interest record containing the tokens of the expected geo-search query in the set of electronic point-of-interest record; ordering the plurality of document point-of-interest record by decreasing relevance to the expected geo-search query to form an ordered list of document point-of-interest record; and creating a first key-value pair for the ordered expected geo-search query, wherein the key for the first key-value pair comprises the ordered expected geo-search query and the value for the first key-value pair comprises the ordered list of point-of-interest record references.

Methods and systems for configuring a geo-search engine to provide spelling corrections or suggestions to geo-search queries are also disclosed, comprising: generating, by a computing device, residual strings with associated weights for each token in a point-of-interest record corpus; generating, by a computing device, direct producer lists for each token and residual string; forming, by a computing device, indirect producer lists for each token by propagating direct producer lists; and propagating, by a computing device, tokens with corresponding weights for each token.

Methods and systems for generating a list of the most relevant suggestions or spelling corrections to a geo-search engine user from a collection of suggestions or spelling corrections are also disclosed, comprising: generating, by a computing device, confusion sets for each token in a geo-search query; generating, by the computing device, a confusion matrix from the confusion sets; ranking, by the computing device, suggestions in the confusion matrix by the vector-space angle between the search geo-query and the suggestions; and selecting, by the computing device, each ranked suggestion whose vector-space angle between the geo-search query and the ranked suggestion is less than a vector-space angle between the geo-search query and a point-of-interest record associated with a higher-ranked suggestion.

DETAILED DESCRIPTION

Figure 1A:
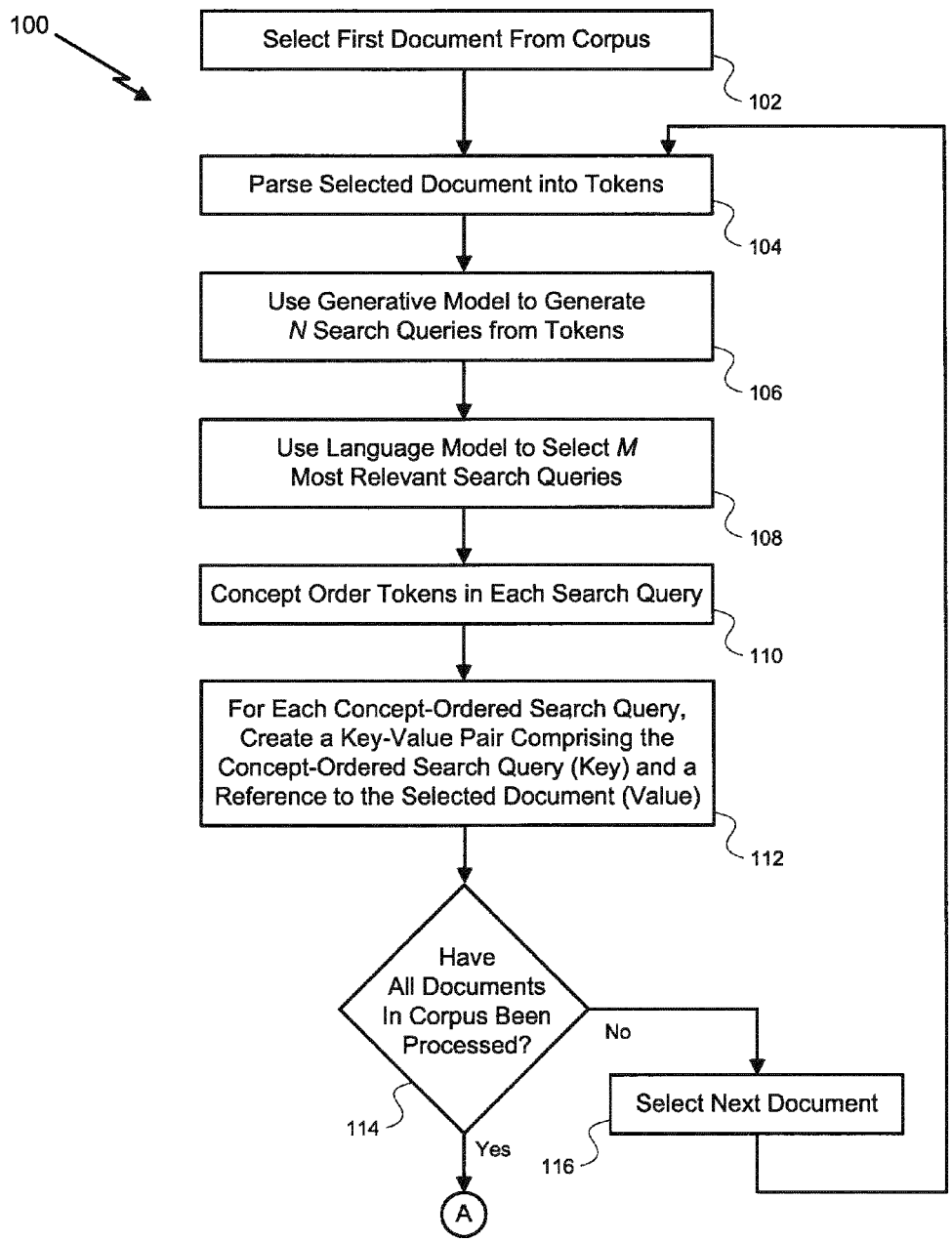
FIGS. 1A and 1B illustrate a method for creating a Partition-by-Query index from a document corpus according to at least one embodiment.

Embodiments described herein utilize a novel "partition-by-query" approach for generating search results by analyzing documents in a corpus to identify queries to which a document would be responsive ("expected queries"), aggregating and prioritizing by relevance documents that are responsive to each expected query to form a prioritized list of documents responsive to each expected query, and delivering a prioritized list of documents responsive to a particular search query upon receiving that search query from a user.

Embodiments described herein also utilize the partition-by-query approach for generating geo-search results by analyzing records in a point-of-interest record corpus to identify expected geo-search queries to which a point of interest would be responsive, aggregating and prioritizing by relevance point-of-interest records that are responsive to each expected geo-search query to form a prioritized list of point-of-interest records responsive to each expected geo-search query, and delivering a prioritized list of point-of-interest records responsive to a particular geo-search query upon receiving that geo-search query from a user.

Partition-by-query embodiments for point-of-interest records reflect modifications to partition-by-query embodiments for documents. Therefore, partition-by-query embodiments for documents are discussed first and partition-by-query embodiments for point-of-interest records are discussed thereafter.

The methods and systems described herein may provide a search result faster and less expensively than existing methods and systems, especially for corpuses that are very large, while still meeting users' search engine expectations for responsiveness, search engine result quality, and ease of use.

Embodiments may also provide capabilities for correcting spelling mistakes that users make while inputting search queries to a search engine. This spelling correction capability may improve search engine speed and responsiveness, thereby meeting or exceeding users' expectations.

Embodiments may additionally provide capabilities for offering real-time search query suggestions. With the suggestion capability, search terms or characters that are known to exist in the corpus may be identified and suggested to the user as the user enters characters into the search text box.

Also described herein are methods and systems for reducing the size of the search engine index. Reducing the size of the search engine index may provide faster responses to search engine queries and lower cost attributable to maintaining the search engine index.

Embodiments may also incorporate a MapReduce capability. The MapReduce capability analyzes documents or point-of-index records in a corpus and generates key-value pairs that will be utilized when compiling a Partition-by-Query index. Use of a MapReduce capability during document or point-of-index record analysis may reduce document or point-of-interest record analysis cost and development time to generate an index for a search engine employing the Partition-by-Query approach.

Embodiments may employ some, all, or none of the aforementioned extensions to the Partition-by-Query approach. Each of these extensions is independent from other extensions and so each extension may be selectively employed to meet the challenges of different search engine environments. The discussion that follows begins with an explanation of the Partition-by-Query approach to providing search results.

Partition by Query

In general, the Partition-by-Query approach to providing search results described herein may be described as having two stages. In a first stage, an initial Partition-by-Query index is generated for use in providing responses to search queries. The Partition-by-Query index may be generated anew or may involve supplementing an existing Partition-by-Query index to account for additional documents or point-of-interest records added to the corpus since the existing Partition-by-Query index was generated. In a second stage, at least part of a search query is received from a user, and the Partition-by-Query index is used to provide one or more search results to the user.

Figure 1B:
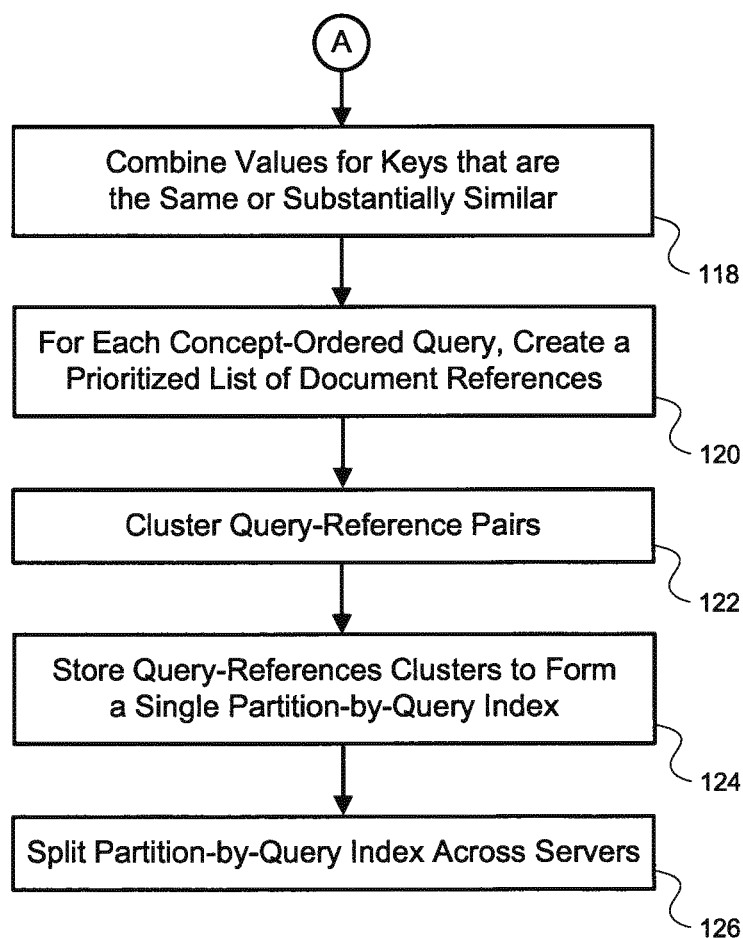

FIGS. 1A and 1B illustrate a method for creating a new Partition-by-Query index from a document corpus according to at least one embodiment of the present invention. As shown in FIG. 1A, creation of the index may begin with a first document being selected from the document corpus for processing (step 102).

Parsing a Selected Document into Tokens

In step 104, the selected document is parsed into tokens. Parsing involves a process of identifying words or symbols within a document. In some embodiments, punctuation and text formatting are ignored when parsing. "Spatial distance" refers to the number of intervening words between two tokens in a document or whether two tokens are present within a single sentence or a single paragraph within a document. A parsing approach that ignores spatial distance between tokens is sometimes referred to as "bag of words" parsing. In some embodiments, the spatial distance between tokens may be determined and the information provided to step 108 so that the spatial distance between tokens may be considered when making relevance determinations.

In some embodiments, a "stop list" may also be utilized when parsing a document. A stop list may direct the parser to ignore certain tokens that would not be useful to forming relevant search queries from the selected document. Grammatical articles such as "a", "an", and "the" are examples of tokens frequently in stop lists. For example, in most cases, the article "the" does not meaningfully distinguish search queries employing that token (e.g., "the Boston Red Sox") from search queries omitting that token (e.g., "Boston Red Sox"). Both search queries could be expected to provide the same prioritized list of responsive documents if the prioritized list of responsive documents was generated robustly.

Yet, some search queries may also be meaningfully distinguished by common articles such as "the". For example, some formal names or titles include articles or other tokens that would otherwise be prime candidates for inclusion in a stop list. Specific examples may include musical groups (e.g., "The Doors" or "The The") and literary works (*The Prince* by Machiavelli) whose names may be difficult to distinguish from other subjects without including articles or other tokens in search queries. Therefore, some embodiments may not utilize a stop list or may remove tokens in a stop list in context-specific situations.

Notwithstanding the context-specific situations discussed above, utilizing a stop list during parsing of documents in the corpus may improve the quality of the resulting Partition-by-Query index by avoiding substantively redundant keys (i.e., search queries which only differ from another search query by the presence or absence of a token on the stop list). Therefore, use of a stop list during parsing may provide benefits in some embodiments.

Generating Search Queries from Tokens

In step 106, one or more search queries to which the selected document would be responsive are generated from the tokens. In certain embodiments, search queries are generated using the Generative Model. In certain embodiments consistent with the principles described herein, the Generative Model is a function that utilizes a hypergeometric distribution combined with the principles of Monte Carlo simulation to determine queries to which the selected document would be responsive. An overview of hypergeometric distributions and Monte Carlo simulation follows.

Hypergeometric distributions reflect a probability that a particular combination of conditions will occur for a given collection of conditions such that the distribution accounts for how the existence of one condition affects the likelihood that another condition will exist. A classic exemplary application of a hypergeometric distribution is determining a probability that four marbles randomly selected from a jar will all be a first color when the jar contains 10 marbles of the first color and 10 marbles of a second color. As each successive marble is removed from the jar, the odds of the next marble being of the first color are reduced relative to the likelihood of a marble of the second color being chosen next. Thus, as this example illustrates, hypergeometric distributions generate probabilities that reflect changing conditions.

Generating search queries from a list of tokens in a document and assigning probabilities to those search queries lends itself to employing a hypergeometric distribution. For example, a document may contain 1000 tokens, including 100 unique tokens. A first unique token may be included twelve times among the 1000 tokens. Therefore, a probability of a search query being formed from a first token and a second token may consider the probability of the first token being selected from the 1000 tokens and the second token being selected from 988 remaining tokens. A hypergeometric distribution accounts for the relationship between token selection and the number of remaining tokens from which to select.

Hypergeometric distributions have been shown to generate accurate probabilities for search queries containing terms within a document. See, for example, Hypergeometric Language Model and Zipf-Like Scoring Function for Web Document Similarity Retrieval, Felipe Bravo-Marquez et al., String Processing and Information Retrieval, Volume 6393/2010 at 303, 305. Hypergeometric distributions can be used to determine the likelihood of a particular search query being issued against a particular document based on the distribution of tokens within that document. For example, a series of prioritized search queries can be determined for a document, where the priority of a particular search query is determined by ranking its probability of being issued against the document relative to the probability of other search queries being issued against the document.

Monte Carlo simulation involves making a series of random selections from a collection of available selections, and utilizing those random selections as inputs to a function to generate a series of results. In Monte Carlo simulation, the accuracy of the collective series of simulation results is somewhat determined by the number of random selections employed to generate the results. As the number of random selections input to a function approaches the number of available selections in the collection of available selections, the accuracy of Monte Carlo simulation results asymptotically approaches the result that would have been achieved through applying formal rather than iterative analytical methods.

For example, calculus is a formal method for determining an area under a curve. By contrast, a Monte Carlo simulation can approximate an area under a curve by randomly selecting points within a region containing areas under the curve and above the curve; i.e., each point is either under the curve or above the curve. As the number of random points in the simulation increases, the ratio between the number of points under the curve and the number of total points in the region asymptotically approaches the ratio between the actual area under the curve and the total area of the region. Monte Carlo simulation can provide an iterative but asymptotically accurate solution to problems reflecting probabilities and distributions. Monte Carlo simulation can be especially useful for problems that are difficult or intractable to solve by formal methods.

In methods and systems described herein, Monte Carlo simulation can be utilized to randomly generate multi-word search queries from the tokens parsed from a document. In embodiments described herein, the Partition-by-Query index may have keys (i.e., search queries) ranging in length from one token to multiple tokens. If the maximum number of tokens (M) per key is, for example, five, Monte Carlo simulation may be used to randomly generate N search queries, each comprised of one to five tokens. While M may be any number, longer search phrases lead to larger indexes, which many conventional search methods cannot handle. The systems and methods described herein allow for larger indices than existing search methods.

In step 106, the process of randomly selecting tokens and computing their likelihood through Monte Carlo simulation is repeated for N number of tokens. If a sufficiently large number of Monte Carlo simulations are run (i.e., if N is a sufficiently large number), an accurate reflection of the various queries that a document would be responsive to can be generated because the Monte Carlo simulation result should asymptotically approach a theoretically accurate result.

For example, in some embodiments, the number of Monte Carlo simulations run for each length of search query may range linearly from a starting value for one-term search queries to an ending value for the maximum-length search queries. In another example, the number of Monte Carlo simulations run for each length of search query may vary logarithmically from a starting value for one-term search queries or may vary as reflected in a function. Those skilled in the art will recognize other ways to distribute the number of Monte Carlo simulations to be run in total (N) between the various search query lengths employed in the Partition-by-Query index without departing from the spirit of the embodiments discussed herein.

Using a Language Model to Select Relevant Search Queries

In step 108, a subset of the most relevant search queries for the selected document is identified from among the search queries generated in step 106. The most relevant subset may be selected by, for example, applying a Language Model. Those skilled in the art will recognize that many language models are available, and that particular language models suit a particular purpose better or worse than other language models depending on circumstances relating to the particular purpose.

In at least some embodiments described herein, the Term Frequency, Inverse Document Frequency ("TF-IDF") language model may be utilized to evaluate search queries. In certain embodiments, Okapi BM25 is utilized to evaluate search queries. In still other embodiments, models or functions other than TF-IDF and Okapi BM25 may be used.

A language model in the context of the present application determines how relevant a search query is for a particular document based on a frequency with which each term is present in the document and the frequency with which that term is present in other documents within the corpus. Therefore, a language model distinguishes search queries containing tokens that are present in a document and are common in documents within a corpus from search queries containing tokens that are present in a document but are rare in documents within the corpus. A search query that is common in a particular document but is rare in the corpus as a whole reflects a particularly relevant search query for locating that document.

Once the relevance of each search query has been determined by applying a language model as discussed above, the M most relevant search queries for a document can be identified in step 108.

Concept Ordering of Search Query Tokens

In step 110, each search query identified in step 108 as "most relevant" is ordered by concept prior to building a key-value index of search queries. One measure of proper concept ordering is that when performed properly it will generate keys with common roots for search queries reflecting similar concepts; i.e., if two search queries are directed to similar concepts, keys for those for those search queries should contain similar initial tokens. By generating keys with common roots for search queries reflecting similar concepts, concept ordering allows queries reflecting similar concepts to be grouped together in a manner that allows for storage efficiency and for efficient implementation of spelling correction and search suggestions, as discussed below.

Concept ordering utilizes token frequency as a measure of how important a token is to a search query. Tokens that are relatively common in documents within the corpus (e.g., "2012") have a high frequency while tokens that are relatively rare in documents within the corpus have a low frequency. Therefore, tokens with low frequency (e.g., "Obama") within a search query are more likely to describe the specific concepts for which documents are sought. Accordingly, tokens with low frequency are more important to the search query than tokens with high frequency. In some embodiments, token frequency may be determined by language models such as those discussed in conjunction with step 108.

Concept ordering reorders the list of tokens within each search query to reflect an ordering based on frequency, with lower frequency tokens preceding higher frequency tokens. After concept ordering has been performed for each search query, each search query begins with a token that is most relevant to the concepts expressed by the search query and proceeds with tokens of decreasing relevance. This token ordering allows search queries directed to related concepts to be lexicographically similar to each other.

For example, search queries "President Obama reelection" and "President Obama 2012" may seek documents reflecting similar concepts—President Obama's 2012 reelection campaign. The search query "President Obama" is also somewhat similar to the two search queries noted above, although search query "President Obama" is broader in concept than the search queries including tokens "reelection" or "2012."

Under one language model, for the search query "President Obama 2012," "Obama" may be the least frequent token within that search phrase for a particular document. Therefore, concept ordering places the token "Obama" as the first token in a concept-ordered index key formed from the search query "President Obama 2012." For the same language model, "President" may be the second-least frequent token and "2012" may be the most-frequent token. Therefore, the concept-ordered token list for the search query "President Obama 2012" would be the tokens "Obama," "President," and "2012."

In some embodiments, tokens in a concept-ordered list are preceded by a corresponding frequency metric. Additionally, in some embodiments, every token in a concept-ordered list is preceded by a frequency metric corresponding to that token. In other embodiments, only some tokens are preceded by corresponding frequency metric; e.g., a second and each subsequent token in a concept-ordered key is preceded by a frequency metric corresponding to that token. In some embodiments, a frequency metric may be a hexadecimal number (e.g., 00CF01) while in other embodiments the frequency metric may be represented in another format.

For example, for a search query "President Obama 2012," the token "President" may have a frequency metric of "00C329," token "Obama" may have a frequency metric of "00001A," and token "2012" may have a frequency metric of "05623B." Therefore, in this example, an ordered token list for the search query "President Obama 2012" may include the following: "00001A," "Obama," "00C329," "President," "05623B," and "2012."

In some embodiments, token and frequency metric padding and/or token and frequency metric delimiters may be utilized to distinguish between tokens and corresponding frequency metrics within a key. For example, token and frequency metric padding can establish a beginning and ending of each token or frequency metric within a key by specifying a fixed length for each token or frequency metric within a key and extending a token or frequency metric to that fixed length with a specific pad character. In some embodiments, the padded length of a token may match the padded length of a frequency metric while in other embodiments these lengths may differ.

In some embodiments, the pad characters precede the token or frequency metric and in other embodiments the pad characters follow the token or frequency metric. In some embodiments, low numbers as frequency metrics may represent low token frequencies while high numbers as frequency metrics may represent high token frequencies. In other embodiments, low numbers as frequency metrics may represent high token frequencies and high numbers as frequency metrics may represent low token frequencies. For example, for a token and frequency metric length of 10 characters and a pad character "0," the token "Obama" may be padded to form "Obama00000" and the frequency metric "00C329" may be padded to form "000000C329."

In another embodiment, delimiters may be used to distinguish between frequency metrics and tokens within a key. In at least one embodiment, the "|" character may delimit frequency metrics and tokens within a key. For example, "00001A|Obama|00C329|President|05623B|2012" may represent a key employing delimiters for the tokens and frequency metrics discussed above. In other embodiments, delimiter characters other than "|" may be used, including delimiter characters that are machine recognizable but not human recognizable. In additional embodiments, more than one delimiter character may be employed to distinguish between tokens and frequency metrics within a key. In some embodiments, padding and delimiters may both be employed to distinguish between tokens and frequency metrics within a key.

In step 112, a key-value pair comprising a concept-ordered search query and a reference to the selected document is created. At the conclusion of step 112, a series of key-value pairs exist for the most relevant search queries.

In step 114, a determination is made whether all documents in the corpus have been processed. If all documents have not been processed, a next document is selected (step 116), and the method continues with step 104. Steps 104-112 are repeated for each document in the corpus to generate a series of search queries and corresponding document references for all documents in the corpus.

Once all documents in the corpus have been processed (step 114), the method continues as shown in FIG. 1B.

Combining Values for Keys that are the Same or Substantially Similar

In step 118, key-value pairs (search query and document reference pairs) that have the same or substantially similar keys are combined to form a single key with a list of corresponding values (referred to hereinafter as a query-references pair). Each reference in the list of references refers to a document that is responsive to the search query.

For example, if documents D1 and D2 are both relevant documents for the search query "President Obama 2012," step 118 may generate query-references pair (0.32|Obama|0.15|President|0.03|2012; D1, D2) by combining references in key-value pairs identifying documents D1 and D2 into a single query-references pair reflecting both documents in the list of references for that query. In another example, document D3 is a relevant document for the search query "President Obama 2012 again" and the token "again" has a relevance metric of "0.01." Therefore, search query "President Obama 2012 again" has a concept-ordered key of "0.32|Obama|0.15|President|0.03|2012|0.01|again."

Concept ordering of search queries allows identification of search queries that are substantially similar and consolidation of such search queries into a single search query. In the examples above, a lexicographical sort of concept-ordered keys for documents D1, D2, and D3 allows for an identification that search queries "President Obama 2012" and "President Obama 2012 again" are only distinguished by a single token whose relevance metric is low by comparison to other tokens because the first three concept-ordered tokens for each search query are the same. Therefore, these search queries and their associated documents can be consolidated into a single search query. Thus, in this example, a single concept-ordered query ("President Obama 2012") and references to documents D1, D2, and D3 may form a query-references pair as discussed above.

The quality of a consolidated search query result may not be meaningfully reduced relative to the relevance of two separate search queries because removed tokens have relatively low relevance metrics by construction. In other embodiments, different or additional evaluations may be performed to determine whether key-value pairs can be consolidated to form a query-references pair. Yet, benefits may be realized by consolidating search queries that are substantially similar. For example, a smaller Partition-by-Query index may be faster to use for providing search engine results and may be faster to generate, thereby providing efficiencies during operation. Additionally, smaller Partition-by-Query indexes may reduce operational costs such as disk storage and hardware needs.

Creating Prioritized Lists of Responsive Documents

In step 120, a prioritized list of values is generated for each key. For each query-references pair of concept-ordered search query tokens and responsive documents generated in step 118, the document references within that query-references pair are prioritized by the key's relevance to associated documents. In some embodiments, a language model is employed to prioritize the document references within values of the key-values pair. In some embodiments, the language model employed to prioritize document references may be the same language model that was employed in step 108 while in other embodiments a different language model may be employed. The language model that is employed, however, will determine how relevant a document as a whole is to a search query represented in the key of a concept-ordered key-values pair.

In at least one embodiment, if document D1 contained one instance of each of tokens "President," "Obama," and "2012," while document D2 contained multiple instances of each token, document D2 would be more relevant to the search query "President Obama 2012" than document D1. Therefore, in that embodiment, document D2 would be prioritized higher than document D1 in the list of document references in a corresponding query-references list for search query "President Obama 2012." Embodiments may also or alternatively consider factors such as length of the document and proximity of search query tokens within the document. Upon completion of step 120, each query-references pair contains a series of values, with each value comprising a document reference, ordered by relevance to the search query.

Combining Key-Values Pairs into Clusters

In step 122, the query-references pairs are compressed into a series of query-references pair clusters. One benefit from combining query-references pairs into clusters is that the size of the Partition-by-Query index may be reduced. Reducing the size of the index will reduce the amount of storage consumed by the Partition-by-Query index.

In some embodiments, the Partition-by-Query index is maintained in a NoSQL or similar data store. Those skilled in the art will recognize that NoSQL stores key-value data efficiently while providing redundancy and relatively high performance. Similar implementations include Google's BigData and Apache's Hadoop.

Data stores similar to NoSQL, BigIndex, and Hadoop typically provide two functions for retrieving data: a "get( )" function that retrieves a value for a specific key in the data store if that specific key is present in the data store; and a "scan( )" function that retrieves the first key lexicographically following a specific key in the data store, whether or not that specific key is actually present in the data store. Embodiments utilizing a scan( ) function within a data store can efficiently store and retrieve clustered query-references pair data by using a key corresponding to the last key in a clustered series of query-references pairs and storing the query-references pairs as the value within the clustered query-references pair.

Moreover, a Partition-by-Query index can efficiently use a scan( ) function, such as those provided by NoSQL, BigData, or Hadoop, to retrieve data within a clustered key. The clustered key is keyed off the last lexicographically ordered key in the cluster because the scan( ) function returns the first entry in the index lexicographically following a key provided as a parameter to the scan( ) function. An example may illustrate these points.

Adding Documents to a Partition-by-Query Index

Although method 100 provides a capability to create a Partition-by-Query index, as discussed above, method 100 could be modified to add documents to a corpus by incorporating document references for the additional documents into an existing Partition-by-Query index. In at least one embodiment, steps 102, 104, 106, 108, 110, 112, 114, 116, 118, and 120 may be executed on a collection of documents to be added to a corpus. Upon completion of step 120, new query-references pairs that do not presently exist in the Partition-by-Query index but were generated from the documents to be added to the index may be added to the Partition-by-Query Index. Additionally, new references for existing queries may be prioritized relative to existing references for the existing queries and added to appropriate locations in the clustered Partition-by-Query index.

Also, the query-references pairs clusters may be adjusted to rebalance the distribution of queries stored in a portion of a Partition-by-Query index stored on a particular server. For example, if documents added to the Partition-by-Query index involve queries that are associated with a portion of the index stored on a particular server, rather than being distributed somewhat evenly between index portions on all servers, one index portion may be disproportionately large relative to other index portions. In this situation, some queries may be moved from one index portion to another index portion to achieve a reasonable balance between index portions.

Figure 2:
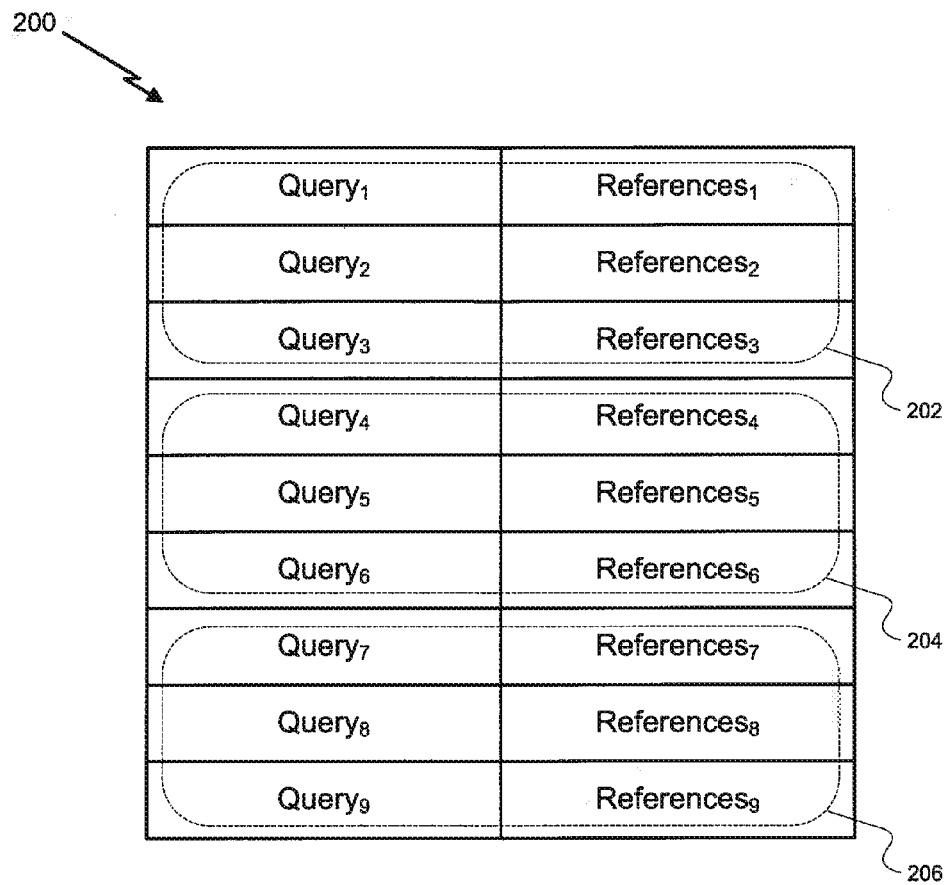
FIG. 2 illustrates several clustered series of key-values pairs in an index consistent with at least one embodiment.

FIG. 2 illustrates several clustered query-references pairs in an index 200 consistent with at least one embodiment. As shown, index 200 comprises a series of key-value pairs, labeled $Query_1$-$References_1$, $Query_2$-$References_2$, $Query_3$-$References_3$, $Query_4$-$References_4$, $Query_5$-$References_5$, $Query_6$-$References_6$, $Query_7$-$References_7$, $Query_5$-$References_5$, and $Query_9$-$References_9$. In this embodiment, index 200 contains nine query-references pairs. Additionally, the query-references pairs are combined into clusters with three query-references pairs per cluster. As shown, index 200 contains clusters 202, 204, and 206.

As discussed above, clusters use the lexicographical last key (query) within a cluster as the key for the cluster. Therefore, clusters 202, 204, and 206 would use $Query_3$, $Query_6$, and $Query_9$ as keys. Additionally, clusters 202, 204, and 206 would use the three query-references pairs associated with the key as values for each corresponding cluster. For example, values corresponding to $Query_3$ in cluster 202 may be $Query_1$-$References_1$, $Query_2$-$References_2$, and $Query_3$-$References_3$. Similarly, values corresponding to $Query_6$ in cluster 204 may be $Query_4$-$References_4$, $Query_5$-$References_5$, and $Query_6$-$References_6$.

Combining query-references pairs in this way may allow for efficient storage and retrieval of data stored in these combined query-references pairs. For example, utilizing the combined form of index 200 discussed above, documents responsive to a concept-ordered search phrase $Query_5$ may be retrieved by providing $Query_5$ as an input to a scan( ) function, which leads to the scan( ) function selecting the cluster whose key is $Query_6$, and receiving the $Query_4$-$References_4$, $Query_5$-$References_5$, and $Query_6$-$References_6$ data in response. From that data, $References_5$ can be retrieved from the $Query_5$-$References_5$ portion of the data.

Additionally, in some embodiments, efficiencies can be realized by performing data compression on the combined key-values pairs prior to storing that pair data in the Partition-by-Query index. For example, a ZIP compression algorithm could be employed to perform lossless compression of the data within a cluster. Those skilled in the art will recognize that other compression algorithms could alternatively be used without departing from the spirit of the discussion above.

Storing the Partition-by-Query Index in One or More Servers

In step 124, the Query-References pair clusters are stored as a single Partition-by-Query index for use in responding to search queries. The Partition-by-Query index may be stored on a single machine. In some embodiments, method 100 concludes with step 124.

In some embodiments, the index is split in step 126 into a plurality of partial Partition-by-Query indexes ("portions") that are stored on separate servers. One reason for splitting a Partition-by-Query index into a plurality of portions is to expand the capability of a search engine to handle more requests than a single server could handle by spreading the queries across servers. Because each server can only respond to a limited number of search queries within a period of time, consumer demand or other factors may require that more than one server be used.

Figure 3:
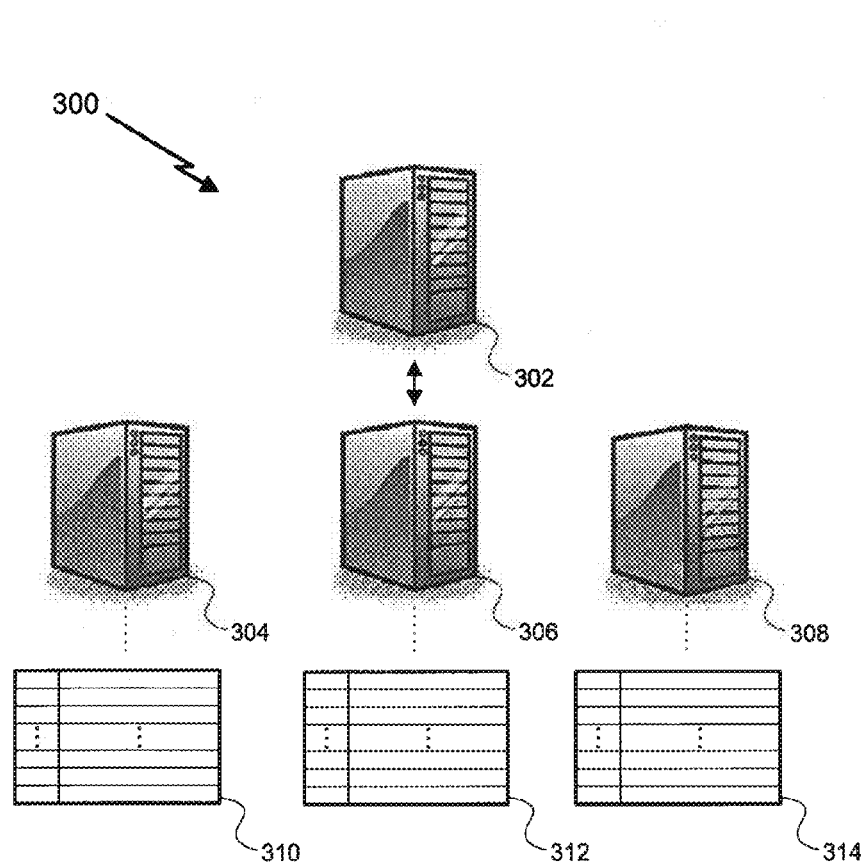
FIG. 3 illustrates a system employing a Partition-by-Query index split across three servers consistent with at least one embodiment.

FIG. 3 illustrates a system 300 employing a Partition-by-Query index split across three servers consistent with at least one embodiment. As illustrated in FIG. 3, system 300 comprises a proxy 302, a first server 304, a second server 306, and a third server 308. First server 304 contains a first portion 310 of a Partition-by-Query index. Second server 306 contains a second portion 312 of the Partition-by-Query index. Third server 306 contains a third portion 314 of the Partition-by-Query index. The portions may be generated, for example, by methods described herein. Each server (304, 306, and 308) contains at least one processor, memory, and a network interface card. In some embodiments, each server may also contain a high-speed disk. Proxy 302 contains at least one processor, memory, and a network connection. In some embodiments, proxy 302 is coupled to each of server 304, 306, and 308 through a network switch (not shown). In other embodiments, proxy 302 may be coupled to each of server 304, 306, and 308 through a networking link other than a network switch.

Figure 4:
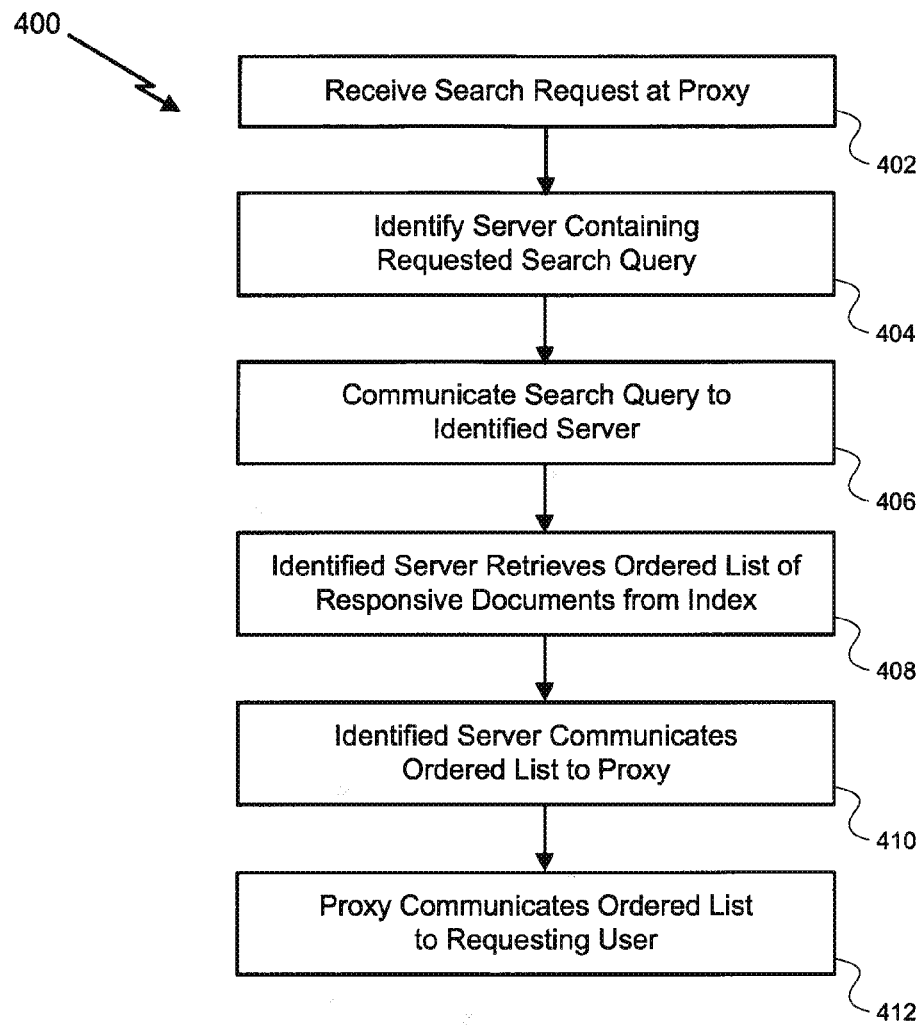
FIG. 4 illustrates a method for responding to a search query request using a Partition-by-Query index with portions stored at a plurality of servers.

FIG. 4 illustrates a method for responding to a search query request using a Partition-by-Query index with portions stored at a plurality of servers, such as shown in FIG. 3. In step 402, a search engine request in the form of a search query is received, for example, at proxy 302. In step 404, proxy 302 determines which server, if any, contains responsive data for that search query. If proxy 302 determines that one of the servers contains responsive data, proxy 302 forwards the search query to that single server in step 406.

Notably, the search query can be forwarded to a single server since proxy 302 knows the identity of the server containing results for the search query based on a list of queries or a lexicographical range of queries for each server maintained by the proxy 302. This feature reduces network traffic within system 300 and improves the ability of system 300 to respond to large numbers of user requests.

In step 408, the identified server receives the forwarded search query from proxy 302 in a form consistent with a particular embodiment and retrieves an ordered list of responsive documents from that server's corresponding portion of the Partition-by-Query index. In step 410, the identified server sends the retrieved list to proxy 302.

In step 412, proxy 302 forwards the ordered list of responsive documents to the requesting user as part of responding to the requesting user's search engine request. In some embodiments, proxy 302 may also format the ordered list of responsive documents to make the list more pleasing to the requesting user. By this method, proxy 302 and the identified server interact to store and retrieve search query results efficiently and at a rate that potentially exceeds the capacity of a single server to receive and process search query results.

Using a MapReduce Capability to Generate the Index

As mentioned above, efficiencies can be realized by partitioning a document corpus into subsets, each of which is provided as the corpus to the method as shown in FIGS. 1A and 1B. The principles described herein also may be combined with a MapReduce framework and libraries to realize greater computational throughput. After each independent portion of the problem has been executed, the results from each independent execution may be combined to form a combined result reflecting the result that would have been generated by a single server executing the original problem.

In some embodiments of the present invention, a MapReduce capability can be utilized in conjunction with the method shown in FIGS. 1A and 1B by splitting a document corpus into a plurality of subsets, executing steps 102, 104, 106, 108, 110, 112, 114, and 116 for each subset, and then combining results from each subset into a single data set prior to executing step 118. Thereafter, steps 118, 120, 122, 124, and 126 would in at least one embodiment be performed by a single server operating on a data set reflecting the results of all subsets. In this way, in some embodiments, a MapReduce capability would provide computational efficiencies and reduce the time to generate a Partition-by-Query index for documents.

Retrieving Search Results from a Partition-by-Query Index

Figure 5:
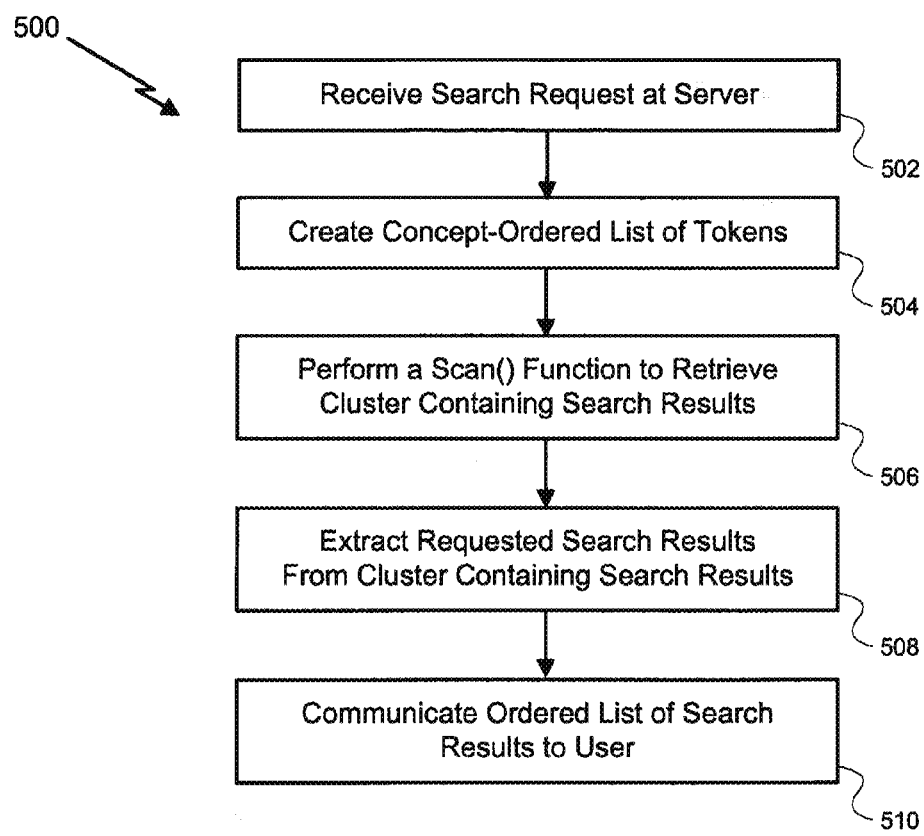
FIG. 5 illustrates a method for retrieving search results from a Partition-by-Query index consistent with at least one embodiment.

FIG. 5 illustrates a method for retrieving search results from a Partition-by-Query index consistent with at least one embodiment of the present invention. In step 502, a server containing a partial or full Partition-by-Query index receives a search request from a user. In some embodiments, as discussed above in conjunction with FIG. 4, the user's search request may be forwarded to the server from a proxy. In other embodiments not employing a proxy, a server may receive the search request from a user without employing a proxy.

In step 504, a concept-ordered list of search tokens is created from the search request received from the user in step 502. As previously discussed, concept-ordered lists of tokens reorder tokens to place terms with low frequency in the corpus first and to place tokens of decreasing frequency in subsequent positions within the concept-ordered list. Additionally, as discussed above, some tokens such as articles may be removed from the search request in some embodiments.

In step 506, a scan( ) function is performed utilizing the concept-ordered list of tokens as an input to the scan( ) function. As previously discussed, the scan( ) function retrieves the first key-values pair following the key in the index where the concept-ordered list of tokens would exist. The values for the key-values pair retrieved by the scan( ) function is a cluster in some embodiments of the present invention. In other embodiments not employing clustering, the values retrieved may represent an ordered list of documents that may be presented as a search result to the user.

In step 508, for embodiments employing clustering, the key-values pair corresponding to the concept-ordered list of tokens within the cluster retrieved in step 606 is retrieved from the cluster to form the list of documents responsive to the search request.

In step 510, method 500 concludes by communicating a message to the user comprising an ordered list of documents responsive to the user's search request.

Suggestions and Spelling Corrections Via Confusion Sets

The Partition-by-Query approach can be extended to provide suggestions and spelling corrections to users. A suggestion is a series of suggested search terms that are proposed to a user as the user types characters into a search engine user interface. Suggestions extend the characters a users has entered into the search engine user interface to propose tokens that are known to exist in the corpus. For example, if a user typed the letters "presid" into a search engine user interface, the search engine could provide suggestions that would complete the user's typing to reflect tokens in the corpus, such as "president", "preside", "presidential", and "presidio."

A spelling correction is a series of suggested search terms that are proposed to a user reflecting tokens that are present in the corpus, each of which may reflect changes to the characters a user has typed into a search engine user interface. Spelling corrections may take two forms: changing a token that does not represent a word in the corpus to reflect a token that is present in the corpus (e.g., changing "hllo" into "hello") and changing a token present into the corpus into a homonym of that token, also present in the corpus (e.g., changing "main" into "Maine").

Embodiments present several suggestions or spelling corrections for each token entered by a user. For example, if a user typed the letters "main" into a search engine user interface, the search engine could provide spelling corrections reflecting tokens in the corpus such as "Maine", "man", "mainly", "pain", etc.

Users expect that modern search engines will make useful suggestions and correct spelling mistakes in real time; i.e., as a user types characters into the search engine user interface. Conventional search engines have a difficult time meeting users' expectations that useful suggestions and spelling corrections be provided in real time because conventional search engines compute variations of tokens that the user enters in real time and perform lookups for each term variation to determine whether the term variation is a token in the corpus. Therefore, some search engines provide suggestions or spelling corrections involving tokens that are less useful than other tokens due to the limited time the search engine has to generate such suggestions and spelling corrections. As a result, users may not be satisfied with the suggestions and spelling corrections produced by conventional search engines.

The Partition-by-Query approach can be extended to generate the "most appropriate" suggestions and spelling corrections for a given token in real time, thereby satisfying users' expectations for useful real time suggestions and spelling corrections. The collection of suggestions and spelling corrections for a particular token is referred to hereinafter as a "confusion set" for that token.

A confusion set contains the most appropriate suggestions and spelling corrections if it includes the suggestions and spelling corrections likely to reflect what the user intended when typing a particular token into a search engine user interface. Generally, suggestions and spelling corrections reflecting small changes to users' tokens (e.g., changing or adding one character) better reflect what users intended than suggestions and spelling corrections reflecting large changes to users' tokens (e.g., changing or adding characters reflecting 50% or more of what the user has entered into the search engine user interface). Therefore, the most appropriate suggestions and spelling corrections are those reflecting small changes to tokens entered by users. Accordingly, the confusion set generated by the Partition-by-Query approach prioritizes suggestions and spelling corrections reflecting small changes to users' tokens over large changes to users' tokens.

Providing suggestions and spelling corrections is a two-step process. First, a collection of suggestions and spelling corrections relating tokens a user could enter to tokens in the corpus is generated prior to the search engine receiving search requests against the Partition-by-Query index. Second, as a user types tokens into a search engine user interface, variations of those tokens are computed in real time and used to identify suggestions and spelling corrections that are presented to the user. This combination of generating suggestions and spelling corrections for each token in the corpus prior to receiving search queries and providing those suggestions and spelling corrections to users in real time as they type tokens into the search engine user interface can provide a solution for suggestions and spelling corrections that meets or exceeds users' expectations for quality responsiveness of the search engine. A discussion of methods and systems implementing these concepts follows.

Figure 6:
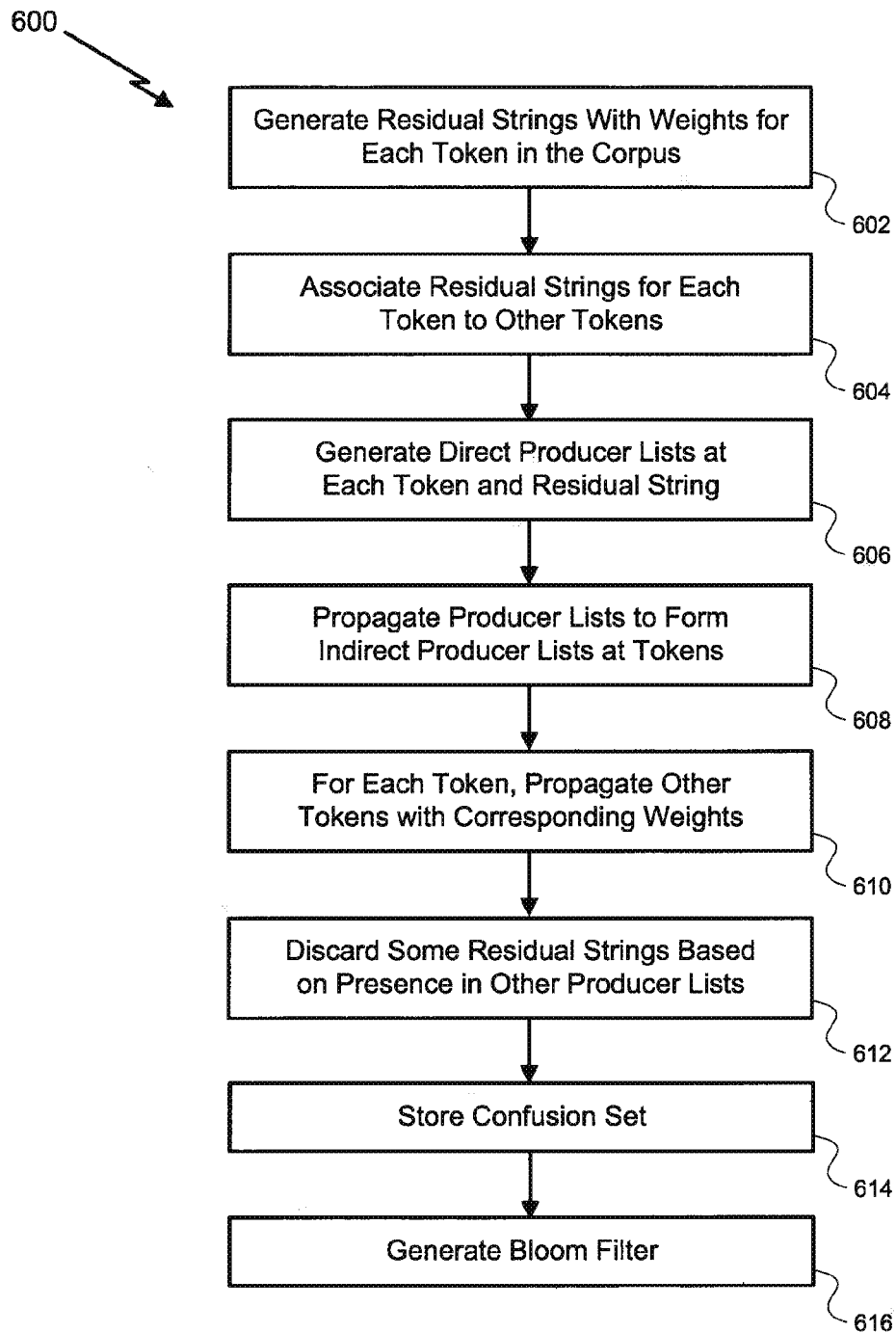
FIG. 6 illustrates a method for generating a confusion set consistent with at least one embodiment.

FIG. 6 illustrates a method 600 for generating a confusion set consistent with at least one embodiment. In step 602, residual strings with corresponding weights for each token in the corpus are generated. A "residual string" is a one-character or multi-character variation from a token. Variations from a token can represent character additions, character modifications, or character removals. For example, for token "bell," "belly," "tell," and "bel" represent residual strings that add, modify, or remove characters. Residual strings do not necessarily represent proper words or tokens in the corpus. As noted above, "bel" is a residual string for token "bell" although "bel" is not a proper English word and it may not represent a token in a corpus. Misspellings, by their nature, may represent expressions that are not proper words or tokens in the corpus. Residual strings, however, can relate misspellings to tokens that are in the corpus.

Residual strings for a token have associated weights representing the number of character variations between the token and the residual string. For example, token "bell" varies by one character from residual string "belly." Therefore, the weight for residual string "belly" relative to token "bell" is one. Residual strings can have weights greater than one. For example, "bellow" is a residual string for token "bell" with a weight of two.

Residual strings can have different weights associated with different tokens. For example, residual string "bellow" may have a weight of two relative to token "bell" and a weight of one relative to token "below."

Residual strings for a token can be created by adding, modifying, or removing characters in each position of the token. For token "bell," residual strings can be created by adding characters between each letter of token "bell" (e.g., "baell," "bbell," etc) modifying each letter of token "bell" (e.g., "cell," "bfll", etc) and removing each letter of token "bell" (e.g., "ell," "bll," and "bel"). Step 102 identifies a series of such residual strings and corresponding weights for each token in the corpus.

Figure 7A:
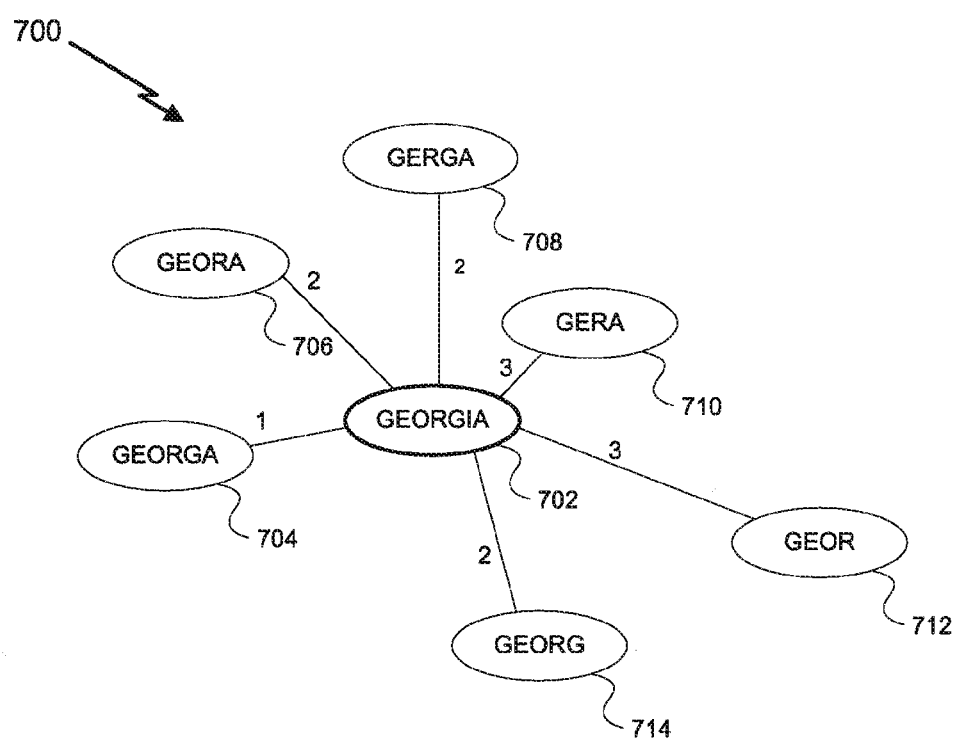
FIG. 7A illustrates a series of residual strings with corresponding weights for a token in at least one embodiment.

FIG. 7A illustrates a series of exemplary residual strings 700 with corresponding weights for token "GEORGIA" 702. As shown, token "GEORGIA" 702 has residual string "GEORGA" 704 of weight 1, residual string "GEORA" 706 of weight 2, residual string "GERGA" 708 of weight 2, residual string "GERA" 710 of weight 2, residual string "GEOR" 712 of weight 3, and residual string "GEORG" 714 of weight 2. Some possible residual strings for token "GEORGIA" were omitted from FIG. 7A for clarity purposes.

Figure 7B:
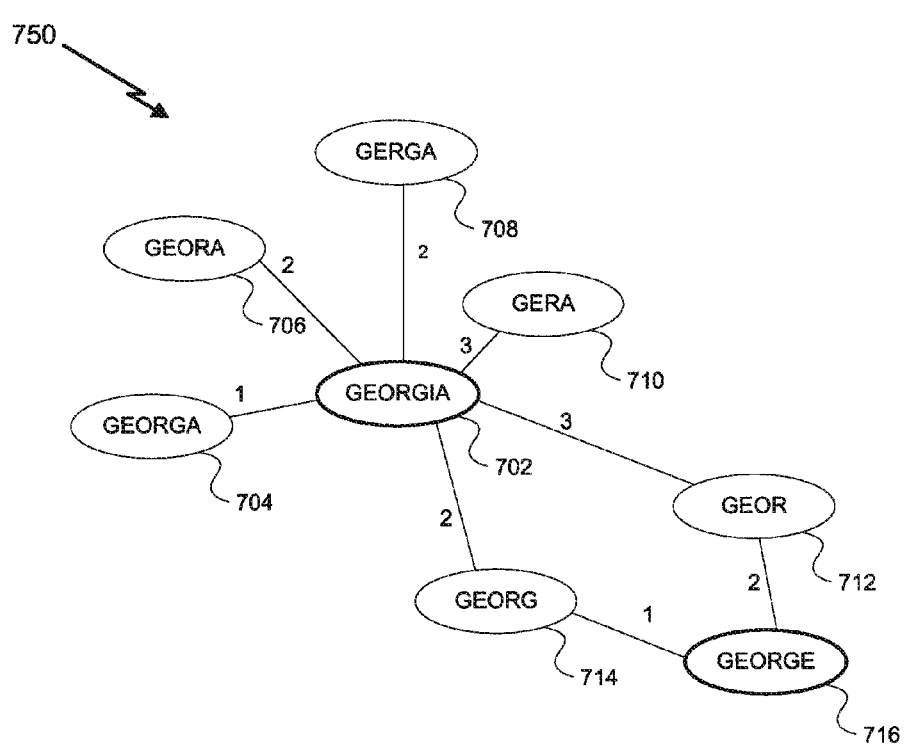
FIG. 7B illustrates relationships between two residual strings and a token in at least one embodiment.

After residual strings and corresponding weights have been generated for each token in the corpus in step 602, step 604 creates associations between each token and residual strings associated with other tokens. For example, as illustrated in FIG. 7B, in at least one embodiment, residual strings "GEORG" 714 and "GEOR" 712 have weights of one and two, respectively, relative to token "GEORGE" 716. Prior to step 604, a residual string "GEORG" 714 may have separately existed for token "GEORGE" 716 and token "GEORGIA" 702. Upon completion of step 604, however, only a single instance of each individual string will exist.

In step 606, a "producer list" is created for each token. The producer list for a token comprises its residual strings and corresponding weights. For example, a producer list for token "GEORGE" 716 may be "{GEORG, 1}; {GEOR, 2}."

In step 608, the producer list for each token is propagated to each residual string to form a "variation list" for that residual string. A variation list for a residual string represents the tokens that can be formed from the residual string and the number of character variations between the residual string and the token. For example, the variation list for residual string "GEORG" 714 is "{GEORGE, 1}; {GEORGIA, 2}." As discussed in conjunction with FIG. 8, the tokens in a variation list for a residual string provide suggestions and spelling corrections for that residual string and the number of character variations for each token in the variation list allows the suggestions and spelling corrections to be prioritized.

In some embodiments, only tokens with less than a certain number of character variations are propagated to residual strings to form variation lists for those residual strings. For example, in at least one embodiment, only tokens with less than 5 character variations to a residual string are propagated to that residual string. In other embodiments, the certain number of allowable character variations may be greater than 5 or less than 5.

In step 610, tokens in the corpus and their corresponding weights are propagated to other tokens. For example, the propagated list of tokens for token "GEORGE" 716 may be "{GEORGIA, 3}," reflecting three character variations from token "GEORGE" 716 through residual string "GEORG" 714 to token "GEORGIA" 702. In some embodiments, only tokens with corresponding weights below a certain limit are propagated to other tokens. For example, in at least one embodiment, only tokens with corresponding weights less than 5 are propagated to other tokens. In other embodiments, the limit may be greater than 5 or less than 5.

In step 612, some redundant residual strings may be discarded. For example, as illustrated in FIG. 7B, residual string "GEORG" 714 is redundant to residual string "GEOR" 712 because each of the associations between residual string "GEORG" 714 and other tokens or residual strings are represented in other residual strings. Therefore, residual string "GEORG" 714 may be removed to reduce the size of the residual string data set. However, tokens and high connectivity residual nodes are retained rather than removed during step 612.

In step 614, the propagated list of tokens with weights for each token and the variation list for each remaining residual string are stored as the confusion set for the corpus. In step 616, the method may conclude by creating a Bloom filter for the confusion set. Those skilled in the art will recognize how to create a Bloom filter. As discussed in conjunction with FIG. 8, a Bloom filter may be used to determine whether suggestions or spelling corrections exist for a current set of characters entered by a user into a search engine user interlace.

Figure 8:
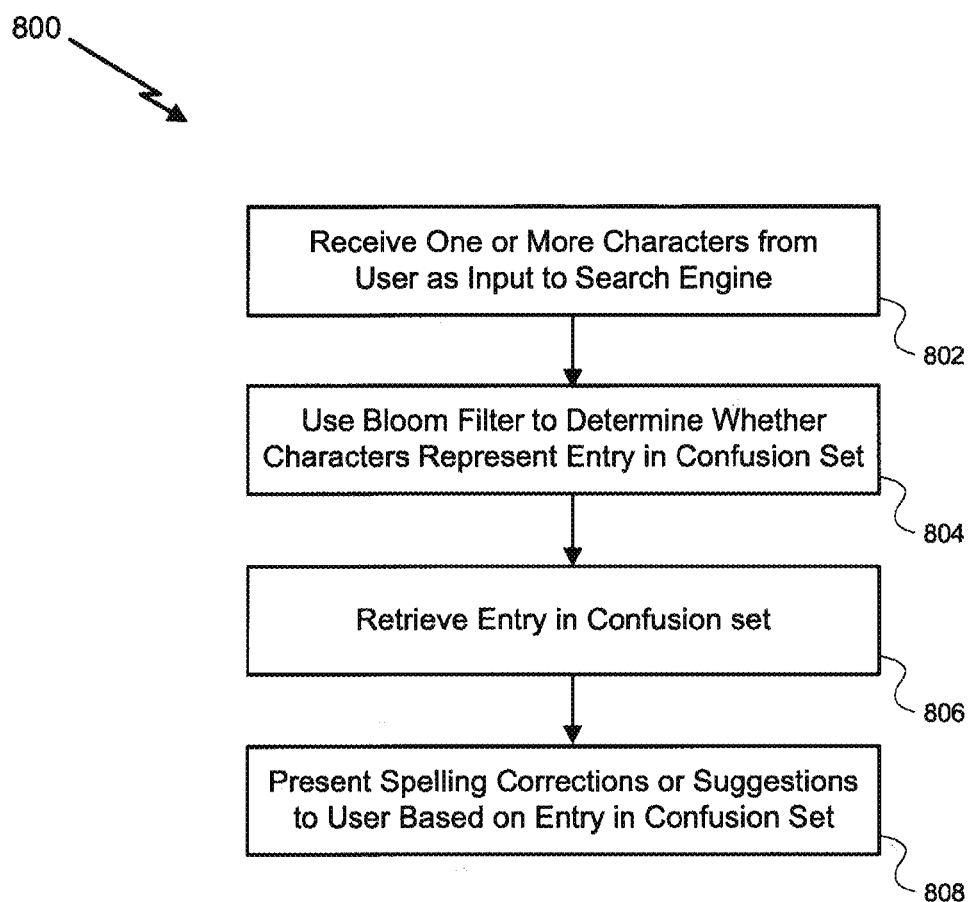
FIG. 8 illustrates a method for providing suggestions and spelling corrections to users based in part on a confusion set in at least one embodiment.

FIG. 8 illustrates an exemplary method 800 for providing suggestions and spelling corrections to users based in part on a confusion set. In step 802, a search engine utilizing a confusion set receives one or more characters as input to the search engine from a user. In some embodiments, each character entered by a user may be individually communicated to the search engine. In other embodiments, upon a character being entered by the user, the search engine may receive all characters that the user has entered for the current token or partial token as input to the search engine.

In step 804, the characters entered by the user for the current token or partial token are input to a Bloom filter and the Bloom filter determines whether those characters represent suggestions or spelling corrections for those characters in the confusion set. In step 806, data representing suggestions or spelling corrections for the characters received from the user is retrieved from the confusion set if the Bloom filter determined that such data was present in the confusion set. In step 808, method 800 concludes by presenting the spelling corrections or suggestions in the data retrieved from the confusion set to the user as search options.

One benefit of the method discussed above is that suggestions and spelling corrections can be provided to a user based on one or possibly only a few references to stored data. By contrast, existing methods typically employ numerous reads from stored data and therefore lead to poor responsiveness to user input and resulting failure to meet users' expectations.

Use of the Principles of Triangle Inequality to Limit Suggestions

Contemporary search engines suffer from an inability to provide effective, ranked suggestions to a user in real time, particularly in the presence of one or more user misspellings. Part of this problem arises from the real-time nature of computing suggestions and providing them to the user as the user enters characters into a search engine user interface. Another part of this problem arises from contemporary search engines' inability to recognize which suggestions are inherently not useful and thus not worth computing or providing to a user.

A users' perception of a search engine is based in part on the relevance of suggestions provided to the user and the responsiveness of the search engine's interface as it provides suggestions in response to users' keystrokes. Contemporary search engines either provide relevant suggestions but with a slow response time, which may be unacceptable to users, or provide timely suggestions that are not as relevant as they could be if more suggestion analysis could be performed, which may also be unacceptable to users. As a result, users may be dissatisfied with contemporary search engines.

Triangle Inequality principles may be used to provide very relevant suggestions to search engine users in real time. Using the principles of Triangle Inequality, relationships between a query, suggestions for that query, and documents in the corpus may be established. The principles of Triangle Inequality provide a criterion for identifying which suggestions among the most relevant suggestions are worth analyzing and presenting to a user, thereby allowing other suggestions to be omitted from analysis. Reducing the number of suggestions that are analyzed in real time, without sacrificing the relevance of suggestions subsequently presented to a user, allows a search engine employing the principles of Triangle Inequality to meet users' expectations for suggestion relevance and responsiveness.

Triangle Inequality concerns relationships between a query, a document, and a suggestion relating the query and the document. As discussed in conjunction with FIGS. 6, 7A, 7B, and 8, suggestions may be formed through use of a confusion set, reflecting a series of suggestions for a particular token provided to a search engine by a user. A "confusion matrix" is the product of confusion sets for the tokens a user has input to a search engine; i.e., a confusion matrix comprises all combinations of the elements of each confusion set. The Triangle Equality allows some or many elements of the confusion matrix to be removed from consideration when presenting suggestions to a user.

A confusion matrix may be formed as follows. In one example, a user inputs the string "Persident Obam" into a search engine and the search engine parses that string into two tokens: "Persident" and "Obam." In this example, a confusion set for "Persident" may be {"president" and "preside"} and a confusion set for "Obam" may be {"Obama" and "Alabama"}. A confusion matrix for these confusion sets would be the product of the terms: {"president Obama"; "president Alabama"; "preside Obama"; and "preside Alabama"}.

Bloom filtering the confusion matrix may allow some irrelevant suggestions to be removed. Those skilled in the art recognize that a Bloom filter may quickly identify strings that are not present in a dataset. Therefore, a Bloom filter can eliminate elements of a confusion matrix by identifying elements whose associated token suggestions are not present in a document within the corpus. Such suggestions can be removed from the confusion matrix because they do not represent suggestions that would be relevant to the user's query; i.e., such suggestions are not conjunctive keys for the corpus.

The principles of Triangle Inequality are expressed in this relationship:

$$\theta_{d,q} \geq \theta_{q,s} + \theta_{s,d}$$

$\theta_{q,s}$ represents a vector-space angle between a query input by a user and a suggestion for that query. This angle reflects a difference between the query and the suggestion due to misspellings in the query, because suggestions are comprised of tokens in a document as discussed in conjunction with FIGS. 6-8.

$\theta_{s,d}$ represents the vector-space angle between a suggestion and a document. $\theta_{s,d}$ is greater than or equal to $\theta_{q,s}$ because the document may include tokens not present in the user's query. If the document only comprises tokens in the user's query, $\theta_{s,d}$ will be equal to $\theta_{q,s}$; otherwise $\theta_{s,d}$ will be greater than $\theta_{q,s}$.

$\theta_{d,q}$ is referred to hereinafter as a "stopping criteria" and represents a vector-space angle between a query input by a user and a document. The value for $\theta_{d,q}$ reflects that $\theta_{q,s}$ (the angle reflecting spelling errors in the query) is propagated into the document where additional terms, not present in the query, reflected by $\theta_{s,d}$, increase the angle further.

Thus, the principles of Triangle Inequality reflect that the vector-space angle between a document and a user's query must be greater than or equal to the sum of a vector space angle between the query and a suggestion for that query and a vector space angle between the suggestion and the document.

Application of the principles of Triangle Inequality to suggestion ranking allows a determination that a set of suggestions in the confusion matrix are more relevant than all other suggestions in the confusion matrix based in part on the stopping criteria. Therefore, when a search engine evaluates which suggestions to provide to a user, the search engine may omit the other suggestions in the confusion matrix from evaluation. Reducing the number of suggestions that are analyzed in real time may tend to improve the responsiveness of the search engine to user input while nonetheless presenting the most relevant suggestions to the user.

Vector-space angles may relate a user's query to a string in a document within a corpus through a mapping function described as follows. For query Q and document string D, the similarity between Q and D may be expressed as the cosine of the vector-space angle between Q and D. Those skilled in the art will recognize that the equation that follows allows this vector-space angle to be computed for a two-token query involving one misspelled token:

$$\cos(\theta_{d,q}) = s \cdot \mu^2 + \frac{\lambda^2}{\left(|D| \cdot \sqrt{\mu^2 + \lambda^2}\right)}$$

In at least one embodiment, for the equation above, $\lambda$ represents the TF-IDF value for a first token of the two-token query, and $\mu$ represents the TF-IDF value for a second token of the two-token query. Additionally, s represents the similarity between one of the two tokens and a suggestion for that token, and "|D|" represents the magnitude of the vector formed by document D. Those skilled in the art will recognize that the equation above can be extended to address queries with more than two tokens and more than one misspelling.

Figure 9:
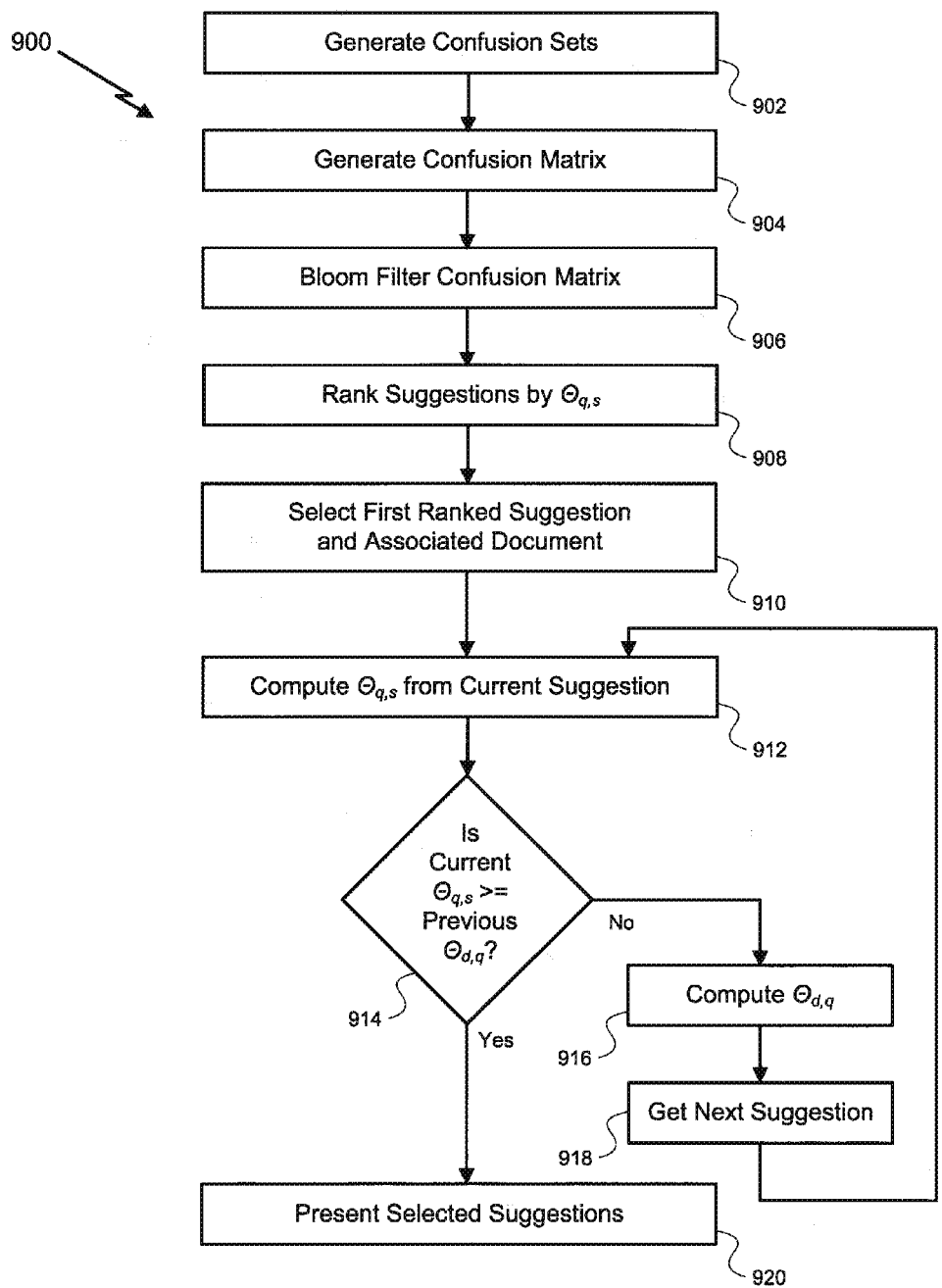
FIG. 9 illustrates a method applying the principles of the Triangle Inequality to identify one or more suggestions for a search query.

FIG. 9 illustrates a method 900 applying the principles of Triangle Inequality to identify one or more suggestions for a search query. In step 902, a confusion set is generated for each token in a search query. In step 904, a confusion matrix is generated from the confusion sets generated in step 902. In step 906, elements of the confusion matrix whose suggestions are not present in a document within a corpus are removed from the confusion matrix. In step 908, the remaining suggestions are ranked by their corresponding $\theta_{q,s}$ value. In step 910, a first ranked suggestion is selected and its associated document is also selected. In step 912, $\theta_{q,s}$ is computed for the current suggestion.

In step 914, a determination is made whether $\theta_{q,s}$ for the current selected suggestion is greater than or equal to $\theta_{d,q}$ for a document associated with the previous selected suggestion. If step 914 evaluates to false, the stopping criteria discussed above has not been met, so $\theta_{d,q}$ is determined for the document associated with the current selected suggestion in step 916, a next selected suggestion is identified in step 918, and the method returns to step 912. If step 914 evaluates to true, however, the stopping criteria discussed above has been met so the method concludes by presenting the selected suggestions to a user in step 920.

As discussed above, method 900 utilizes the principles of Triangle Inequality to select suggestions that are the most relevant to a user, based on a computed stopping criteria. This method may reduce the number of suggestions that a search engine considers and therefore improve the responsiveness of the search engine as perceived by a user.

Generating Confusion Matrices for Multi-Word Tokens

Multi-word tokens, such as "San Francisco," may present challenges to a search engine because the relationship between the tokens in a multi-word token lead to TF-IDF scores for the multi-word token that differ from scores for the individual words. Stated differently, documents discuss "San Francisco" at a different rate than the same documents discuss "San" and "Francisco." Therefore, providing reliable suggestions to a user may involve treating multi-word tokens differently than single-word tokens.

An additional benefit to treating multi-word tokens differently than single-word tokens is that treatment of multi-word tokens tends to reduce the length of search strings, which reduces processing time and storage costs for a Partition-by-Query index. For example, "San Francisco vacation" could be parsed as three single-word tokens or one multi-word token and one single-word token (i.e., two tokens total). As noted above, having fewer tokens reduces processing time and storage costs so multi-word tokens are desirable.

Identification of multi-word tokens may involve considering all possible combinations of tokens to determine which tokens comprise multi-word tokens. More specifically, for T tokens provided by a user, T−1 spaces exist between tokens and $2^{T-1}$ combinations of the T tokens could form multi-word tokens.

Unfortunately, each combination in the $2^{T-1}$ combinations may involve a confusion set whose term probabilities are computed. Fortunately, T is typically relatively small (e.g., T=5) and reduced forms of confusion matrices can be formed from a subset of values within the confusion sets.

Specifically, reduced forms of confusion matrices can be formed by only considering the first row of a confusion matrix, which is formed from the first elements of each corresponding confusion set. Other rows in the confusion matrix, formed from elements other than the first element in each corresponding confusion set, may have less relevant results and would therefore be less useful for analysis of multi-word tokens. From the rows of the reduced forms of confusion matrices, each row is ranked by similarity to the combination of the individually spell-corrected (via confusion sets) user tokens, and the B most similar rows are retained for handling multi-word tokens. In some embodiments, B=10, resulting in only ten or fewer rows to be considered during multi-word token analysis.

The foregoing discussion utilizes the partition-by-query approach for generating search results by analyzing a document corpus to identify expected queries for which a document would be responsive, aggregating and prioritizing by relevance documents that are responsive to each expected query to form a prioritized list of documents responsive to each expected query, and delivering a prioritized list of documents responsive to a particular search query upon receiving that search query from a user.

Embodiments described below extend the partition-by-query approach to generate geo-search results from point-of-interest ("POI") records. These embodiments analyze a geo-information corpus comprised of POI records to identify expected queries to which a point of interest or location would be responsive, aggregate and prioritize by relevance POI records that are responsive to each expected geo-search query to form a prioritized list of POI records responsive to each expected geo-search query, and deliver a prioritized list of POI records responsive to a particular geo-search query upon receiving that geo-search query from a user.

In some embodiments, the order of the prioritized list of POI records is determined in part by proximity to a reference location for the location of the point of interest reflected in the POI record. For example, a geo-search query for "pizza 123 main street" may return a series of points of interest that are relevant for locating pizza in an order based in part on decreasing proximity to reference location "123 Main Street." In other embodiments, ordering of geo-search query results is determined in part by textual relevance to a target (e.g., "pizza") within a predetermined region containing the reference location. For example, geo-search query results for "pizza pasta salad 123 main street" may return a series of points of interest relevant to locating pizza, pasta, and salad in part by degree of relevance within a 10-block radius of 123 Main Street; e.g., the best match would relevant to all three foods, while a lesser match would be relevant to two of three foods and the worst match would be relevant to only one of the three foods. In still other embodiments, ordering of search results is determined in part by a combination of textual relevance and proximity. Notwithstanding the partial determining factors described above, other factors may also influence ordering of search results in each of the aforementioned embodiments.

In some embodiments, each POI record contains information that comprises a name, a location, and one or more tags for a point of interest. In some embodiments, the location in a POI record comprises address information for the point of interest and a latitude and longitude for the point of interest. In some embodiments, the address information for a point of interest may include a series of geographical definitions including a street address (e.g., "123 Main St."), a city name, a state name, a country name, and a postal code. In other embodiments, address information for a point of interest may include additional geographical definitions; e.g., a neighborhood name for a point of interest within a city, such as the "Russian Hill" neighborhood in San Francisco, or a name of a continent. In different embodiments, address information for a point of interest may include fewer geographical definitions than described above; e.g., a country name for a point of interest may be omitted from the address information in the POI record.

In some embodiments, each POI record also contains one or more tags that associate the point of interest described by the POI record with "target categories" for which the point of interest could be responsive. For example, if a POI record reflects a restaurant that serves pizza, the POI record for that restaurant may contain a tag for the term "pizza." In this way, the restaurant reflected in the POI record is identified within the geo-information corpus as a restaurant that serves pizza and the POI record would reflect that the point of interest may be responsive to a user's search for pizza.

In some embodiments, for points of interest that are associated with more than one target category, tags may exist in the POI record for each associated target category. For example, if the aforementioned pizza restaurant also serves pasta and ice cream, tags for "pasta" and "ice cream" may also be present in the POI record for that restaurant to allow the POI record to be responsive to geo-searches for pasta and ice cream. In some embodiments, additional tags may be present in a POI record reflecting more generalized categories for which a user may search. For example, the POI record for the restaurant discussed above may also include tags for "Italian food" and for "restaurant." Thus, in some embodiments a POI record may comprise one tag while in other embodiments a POI record may comprise multiple tags.

In some embodiments, POI records may also be associated with one or more geographic groups. A geographic group associates points of interest to a geographically defined area. For example, a geographic group may exist for points of interest within a predetermined distance of Lombard Street in San Francisco. In some embodiments, the existence of this geographic group may allow for efficient identification of points of interest with certain qualities that users may search for (e.g., a restaurant that serves pizza) within that predetermined distance of Lombard Street.

In such embodiments, geographic groups may exist for multiple levels of geographic abstraction, including streets, neighborhoods, cities, states, countries, continents, or even arbitrary geographical groupings not tied to traditional geographic definitions (e.g., a portion of a street). In some embodiments, a point of interest may be a member of more than one geographic group; e.g., a pizza restaurant on Lombard Street may be a member of the Lombard Street geographic group and may also be a member of the San Francisco geographic group.

In some embodiments, geographic groups may exist for geographic abstractions that a geo-search user may employ in a geo-search query. For example, geographic groups may exist for areas around streets and street intersections; e.g., a Lombard Street group may include points of interest within 10 blocks of any point along Lombard Street and a Lombard-Polk group may include points of interest within a predetermined distance from the intersection of Lombard and Polk Streets in San Francisco. Geographic groups may also exist for areas surrounding defined regions such as cities. For example, a geographic group may exist for the city of Santa Clara, Calif. and that group may include points of interest within the city of Santa Clara and points of interest in cities adjacent to Santa Clara, such as Sunnyvale and San Jose.

In some embodiments, the points of interest in each geographic group may be determined from latitude and longitude values for each point of interest, as reflected in a corresponding POI record, and from latitude and longitude coordinates for the legal boundaries of geographic regions such as cities or neighborhoods. In other embodiments, a database for a geographic group may store POI records or references to POI records for each point of interest within the geographic group. Those skilled in the art will recognize that other ways to associate a POI record with a geographic group are possible.

Figure 10A:
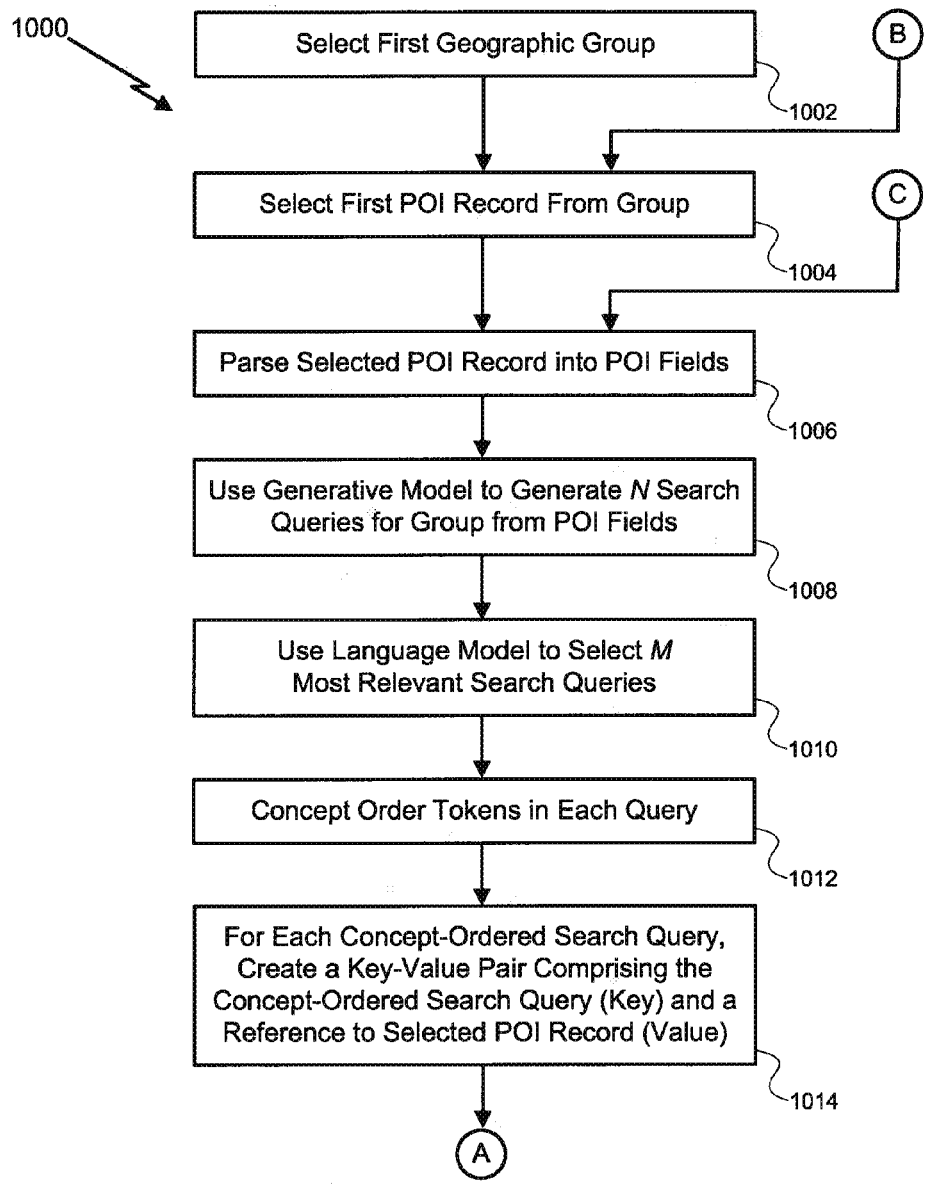
FIGS. 10A, 10B, and 10C illustrate a method for creating a Partition-by-Query index from a point-of-interest record corpus according to at least one embodiment.
Figure 10B:
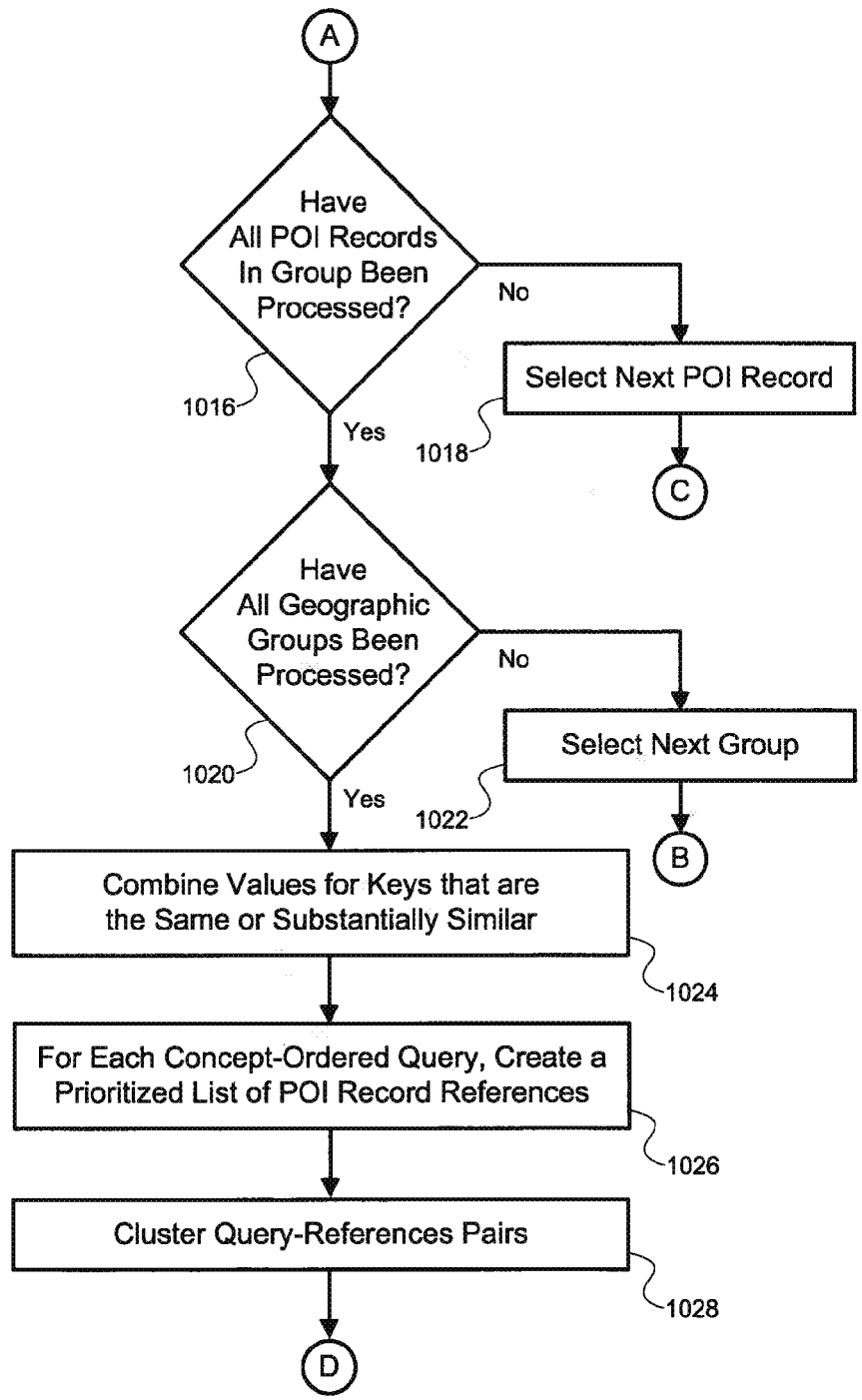
Figure 10C:
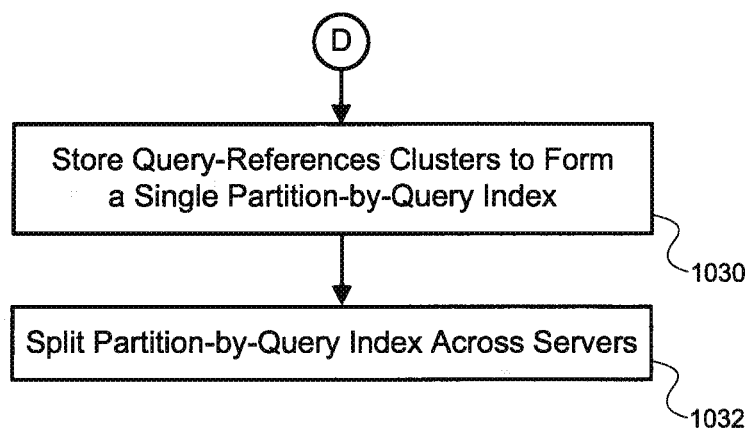

FIGS. 10A, 10B, and 10C illustrate a method 1000 for creating a new Partition-by-Query index from a point-of-interest record corpus according to at least one embodiment of the present invention. As shown in FIG. 10A, creation of the index may begin with a first geographic group being selected for processing (step 1002). In step 1004, a POI record associated with the selected group is selected for processing.

Parsing the Selected POI Record into POI Fields

In step 1006, the selected POI record is parsed into POI fields. In some embodiments, each field within a POI record is a POI field. For example, in embodiments where each POI record comprises fields including a name, a street address, a city, a state, a country, a postal code, a neighborhood, a continent, a latitude, and a longitude, each of these fields in a POI record are POI fields. In some embodiments, each tag in a POI record is also a POI field. In some embodiments, a stop list may also be utilized when parsing a POI record. For example, the stop list may remove the article "the" from point-of-interest names such as "The Bar."

Generating Geo-Search Queries from POI Fields

In step 1008, one or more geo-search queries to which the selected POI record would be responsive are generated from the POI fields for the current group. In certain embodiments, geo-search queries to which a selected POI record would be responsive are generated using the Generative Model.

In methods and systems described herein, Monte Carlo simulation can be utilized to randomly generate multi-word geo-search queries from the POI fields. In embodiments described herein, the Partition-by-Query index may have keys (i.e., geo-search queries) ranging in length from single-word fields (e.g., "california" or "pizza") to search phrases reflecting a target to search for and a region in which to search (e.g., "pizza mission street san francisco"). If the maximum number of POI fields (M) per key is, for example, five, and each POI field comprises one or more words, Monte Carlo simulation may be used to randomly generate N geo-search queries, each comprising one or more words, from POI fields in a POI record. While M may be any number, longer geo-search phrases lead to larger indexes, which many conventional search methods cannot handle. The systems and methods described herein allow for larger indices than existing geo-search methods.

In some embodiments, each generated geo-search query includes an identifier for the current geographic group. For example, if the current group being processed represented the city of San Francisco, the tokens "san francisco" may be added to each generated geo-search query. In another example, if the current group represented the San Francisco neighborhood "Russian Hill" or the region surrounding the intersection of Lombard Street and Polk Street, tokens "russian" and "hill" or the tokens "lombard" and "polk", respectively, may be added to the generated geo-search query. Adding tokens corresponding to the current geographical group can improve the relevance of generated geo-search queries for POI records associated with a geographic group. In some embodiments, a token corresponding to the current geographical group is only added to a generated geo-search query if that token is not already present in the generated geo-search query; i.e., redundant tokens in the geo-search query are avoided. In other embodiments, a token corresponding to the current geographical group is added to a generated geo-search query regardless of whether that token is already present in the geo-search query.

In step 1008, the process of randomly selecting tokens and computing their likelihood through Monte Carlo simulation is repeated for N number of tokens. If a sufficiently large number of Monte Carlo simulations are run (i.e., if N is a sufficiently large number), an accurate reflection of the various queries to which a POI record would be responsive can be generated because the Monte Carlo simulation result should asymptotically approach a theoretically accurate result.

Using a Language Model to Select Relevant Geo-Search Queries

In step 1010, a subset of the most relevant geo-search queries for the selected POI record is identified from among the geo-search queries generated in step 1008. In some embodiments, the most relevant subset may be selected by, for example, applying a Language Model referencing the set of all POI records. For example, the Language Model may predict that a geo-search query containing the tag "zoo" or the name "Za's" (a pizza restaurant in San Francisco) may tend to be more relevant for POI records containing that tag or name than other queries for the same POI record because the frequency of the words "zoo" and "Za's" may be relatively low within the corpus of all POI records. As previously discussed in conjunction with document corpus embodiments, the TF-IDF language model, Okapi BM25 language model, or another language model may be utilized to identify the most relevant subset of queries previously generated.

Once the relevance of each geo-search query has been determined by applying a language model as discussed above, the M most relevant geo-search queries for a POI record can be identified in step 1010.

Concept Ordering of Geo-Search Query Tokens

In step 1012, each geo-search query identified in step 1010 as "most relevant" is ordered by concept prior to building a key-value index of geo-search queries.

As previously discussed in conjunction with document corpus embodiments, concept ordering reorders the list of words within each search query to reflect an ordering based on frequency, with lower frequency words preceding higher frequency words. After concept ordering has been performed for each geo-search query, each geo-search query begins with a token that is most relevant to the concepts expressed by the geo-search query and proceeds with tokens of decreasing relevance. This token ordering allows geo-search queries directed to related concepts to be lexicographically similar to each other.

Under one language model, for a geo-search query of "guitar santa clara", "guitar" may be the least frequent token within that geo-search phrase. Therefore, concept ordering places the token "guitar" as the first token in a concept-ordered index key formed from the geo-search query "guitar santa clara." For the same language model, "clara" may be the next-least frequent token and "santa" may be the most-frequent token. Therefore, the concept-ordered token list for the geo-search query "guitar santa clara" would be the tokens "guitar", "clara", and "Santa."

In some embodiments, tokens in a concept-ordered list are preceded by a corresponding frequency metric. Additionally, in some embodiments, every token in a concept-ordered list is preceded by a frequency metric corresponding to that token. In other embodiments, only some tokens are preceded by corresponding frequency metric; e.g., a second and each subsequent token in a concept-ordered key is preceded by a frequency metric corresponding to that token. In some embodiments, a frequency metric may be a hexadecimal number (e.g., 00CF01) while in other embodiments the frequency metric may be represented in another format.

For example, for geo-search query "guitarist santa clara," token "guitarist" may have a frequency metric of "00032F", token "clara" may have a frequency metric of "001247", and token "santa" may have a frequency metric of "013492". Therefore, in this example, an ordered token list for the geo-search query "guitarist santa clara" may include the following: "00032F", "guitarist", "001247", "clara", "013492", and "santa".

In some embodiments, token and frequency metric padding and/or token and frequency metric delimiters may be utilized to distinguish between tokens and corresponding frequency metrics within a key. For example, token and frequency metric padding can establish a beginning and ending of each token or frequency metric within a key by specifying a fixed length for each token or frequency metric within a key and extending a token or frequency metric to that fixed length with a specific pad character. In some embodiments, the padded length of a token may match the padded length of a frequency metric while in other embodiments these lengths may differ.

In some embodiments, the pad characters precede the token or frequency metric and in other embodiments the pad characters follow the token or frequency metric. For example, for a token and frequency metric length of 10 characters and a pad character "0," the token "guitarist" may be padded to form "guitarist0" and the frequency metric "00032F" may be padded to form "000000032F". In some embodiments, low numbers as frequency metrics may represent low token frequencies while high numbers as frequency metrics may represent high token frequencies. In other embodiments, low numbers as frequency metrics may represent high token frequencies and high numbers as frequency metrics may represent low token frequencies.

In another embodiment, delimiters may be used to distinguish between frequency metrics and tokens within a key. In at least one embodiment, the "|" character may delimit frequency metrics and tokens within a key. For example, "00032F|guitarist|001247|clara|013292|santa" may represent a key employing delimiters for the tokens and frequency metrics discussed above. In other embodiments, delimiter characters other than "|" may be used, including delimiter characters that are machine recognizable but not human recognizable. In additional embodiments, more than one delimiter character may be employed to distinguish between tokens and frequency metrics within a key. In some embodiments, padding and delimiters may both be employed to distinguish between tokens and frequency metrics within a key.

In step 1014, a key-value pair comprising a concept-ordered geo-search query and a reference to the selected POI record is created. At the conclusion of step 1014, a series of key-value pairs exist for the most relevant geo-search queries for the current POI record within the current group.

In step 1016, a determination is made whether all POI records in the current group have been processed. If all POI records have not been processed, a next POI record is selected (step 1018), and the method continues with step 1006. Steps 1006-1014 are repeated for each POI record associated with the current geographic group to generate a series of geo-search queries and corresponding POI record references for all POI records in the current group.

Once all POI records in the current geographic group have been processed (step 1016), the method continues as shown in FIG. 10B.

In step 1020, a determination is made whether all geographic groups have been processed. If all geographic groups have not been processed, a next geographic group is selected (step 1022), and the method continues with step 1004. Steps 1004-1020 are repeated for each geographic group to generate a series of geo-search queries and corresponding POI record references for all geographic groups.

Combining Values for Keys that are the Same or Substantially Similar

In step 1024, key-value pairs (geo-search query and POI record reference pairs) that have the same or substantially similar keys are combined to form a single key with a list of corresponding values (referred to hereinafter as a query-references pair). Each reference in the list of references refers to a POI record that is responsive to the geo-search query reflected in the key.

For example, if P1 and P2 are both relevant POI records for the search query "guitar store california," step 1024 may generate query-references pair (0039B6|guitar|01663D|california|2D6921|store; P1, P2) by combining references in key-value pairs identifying documents P1 and P2 into a single query-references pair reflecting both points of interest in the list of references for that geo-search query. In another example, document P3 is a relevant point of interest for the geo-search query "musical guitar store california" and the token "musical" has a relevance metric of "094621". Therefore, geo-search query "musical guitar store california" has a concept-ordered key of "0039B6|guitar|01663D|california|094621|musical|2D6921|store".

Concept ordering of geo-search queries allows identification of geo-search queries that are substantially similar and consolidation of such geo-search queries into a single geo-search query. In the examples above, a lexicographical sort of concept-ordered keys for documents P1, P2, and P3 allows for an identification that search queries "guitar store california" and "musical guitar store california" are only distinguished by a single token whose relevance metric is low by comparison to other tokens because the first two concept-ordered tokens for each geo-search query are the same. Therefore, these geo-search queries and their associated POI records can be consolidated into a single geo-search query. Thus, in this example, a single concept-ordered query ("guitar store california") and references to documents P1, P2, and P3 may form a query-references pair as discussed above.

The quality of a consolidated geo-search query result may not be meaningfully reduced relative to the relevance of two separate geo-search queries because removed tokens have relatively low relevance metrics by construction. In other embodiments, different or additional evaluations may be performed to determine whether key-value pairs can be consolidated to form a query-references pair. Yet, benefits may be realized by consolidating geo-search queries that are substantially similar. For example, a smaller Partition-by-Query index may be faster to use for providing geo-search engine results and may be faster to generate, thereby providing efficiencies during operation. Additionally, smaller Partition-by-Query indexes may reduce operational costs such as disk storage and hardware needs.

Creating Prioritized Lists of Responsive POI Record References

In step 1026, a prioritized list of values is generated for each key. Different embodiments may employ different criteria for prioritizing values generated for each key. For example, some embodiments may prioritize values by decreasing geographic proximity to a point of interest identified in the key; i.e., values reflecting points of interest near a reference location are prioritized higher than values reflecting points of interest far from a reference location. Other embodiments, however, may prioritize values by textual relevance. Still other embodiments may prioritize values by a weighting that combines proximity and textual relevance.

For each query-references pair of concept-ordered geo-search query tokens and references to responsive POI records generated in step 1024, the POI record references within that query-references pair are prioritized by the key's priority to associated POI records. In some embodiments, a language model is employed to prioritize the POI record references within values of the key-values pair by textual relevance as discussed in conjunction with document corpus embodiments. In some embodiments, the language model employed to prioritize POI record references may be the same language model that was employed in step 1010 while in other embodiments a different language model may be employed. In such embodiments, the language model that is employed, however, will determine how textually relevant a POI record as a whole is to a geo-search query represented in the key of a concept-ordered key-values pair.

In embodiments employing proximity during a priority determination, proximity between a reference location and a point of interest can be determined from the latitude and longitude of the reference location and the latitude and longitude of the point of interest. In embodiments employing proximity and textual relevance, proximity and textual relevance may be determined for each value and a first weighting factor may be applied to the proximity result and a second weighting factor may be applied to the relevance result. A summation of the weighted proximity and weighted relevance may determine the priority of a value in such embodiments.

Upon completion of step 1026, each query-references pair contains a series of values, with each value comprising a POI record reference, ordered by relevance to the geo-search query.

Combining Key-Values Pairs into Clusters

In step 1028, the query-references pairs are compressed into a series of query-references pair clusters. One benefit from combining query-references pairs into clusters is that the size of the Partition-by-Query index may be reduced. Reducing the size of the index will reduce the amount of storage consumed by the Partition-by-Query index.

In some embodiments, the Partition-by-Query index is maintained in a NoSQL or similar data store. As discussed in conjunction with the FIG. 1, data stores typically provide two functions for retrieving data: a "get( )" function that retrieves a value for a specific key in the data store if that specific key is present in the data store; and a "scan( )" function that retrieves the first key lexicographically following a specific key in the data store, whether or not that specific key is actually present in the data store. Embodiments utilizing a scan( ) function within a data store can efficiently store and retrieve clustered query-references pair data by using a key corresponding to the last key in a clustered series of query-references pairs and storing the query-references pairs as the value within the clustered query-references pair.

Moreover, a Partition-by-Query index can efficiently use a scan( ) function, such as those provided by NoSQL, BigData, or Hadoop, to retrieve data within a clustered key. The clustered key is keyed off the last lexicographically ordered key in the cluster because the scan( ) function returns the first entry in the index lexicographically following a key provided as a parameter to the scan( ) function. An example of retrieving data using a scan( ) function was discussed in conjunction with FIG. 1.

Adding POI Records to a Partition-by-Query Index

Although method 1000 provides a capability to create a Partition-by-Query index, as discussed above, method 1000 could be modified to add POI records to a POI record corpus by incorporating POI record references for the additional POI records into an existing Partition-by-Query index. In at least one embodiment, steps 1002, 1004, 1006, 1008, 1010, 1012, 1014, 1016, 1018, 1020, 1022, 1024, 1026, and 1028 may be executed on a collection of POI records to be added to a POI record corpus. Upon completion of step 1028, new query-references pairs that do not presently exist in the Partition-by-Query index but were generated from the POI records to be added to the index may be added to the Partition-by-Query Index. Additionally, new references for existing queries may be prioritized relative to existing references for the existing queries and added to appropriate locations in the clustered Partition-by-Query index.

Also, the query-references pairs clusters may be adjusted to rebalance the distribution of queries stored in a portion of a Partition-by-Query index stored on a particular server. For example, if POI records added to the Partition-by-Query index involve queries that are associated with a portion of the index stored on a particular server, rather than the added POI record references being distributed more evenly between index portions on all servers, one index portion may be disproportionately large relative to other index portions. In this situation, some queries may be moved from one index portion to another index portion to achieve a reasonable balance between index portions.

As discussed in conjunction with FIG. 2, query-reference pairs can be clustered for efficiency purposes. Although the discussion of FIG. 2 was in the context of a document corpus rather than a POI record corpus, the aforementioned techniques for clustering are applicable to query-reference pairs for POI record references and predicted queries for those points of interest. The aforementioned benefits and embodiments for compressing key-value pairs related to documents prior to storing that data in a Partition-by-Query index for documents also exist for compressing key-values pairs related to POI records and predicted geo-search queries.

Storing the Partition-by-Query Index in One or More Servers

In step 1030, the Query-References pair clusters are stored as a single Partition-by-Query index for use in responding to geo-search queries. The Partition-by-Query index may be stored on a single machine. In some embodiments, method 1000 concludes with step 1030.

In other embodiments, the Partition-by-Query index is split in step 1032 into a plurality of partial Partition-by-Query indexes ("portions") that are stored on separate servers. One reason for splitting a Partition-by-Query index into a plurality of portions is to expand the capability of a geo-search engine to handle more requests than a single server could handle by spreading the queries across servers. Because each server can only respond to a limited number of geo-search queries within a period of time, consumer demand or other factors may require that more than one server be used.

Figure 11:
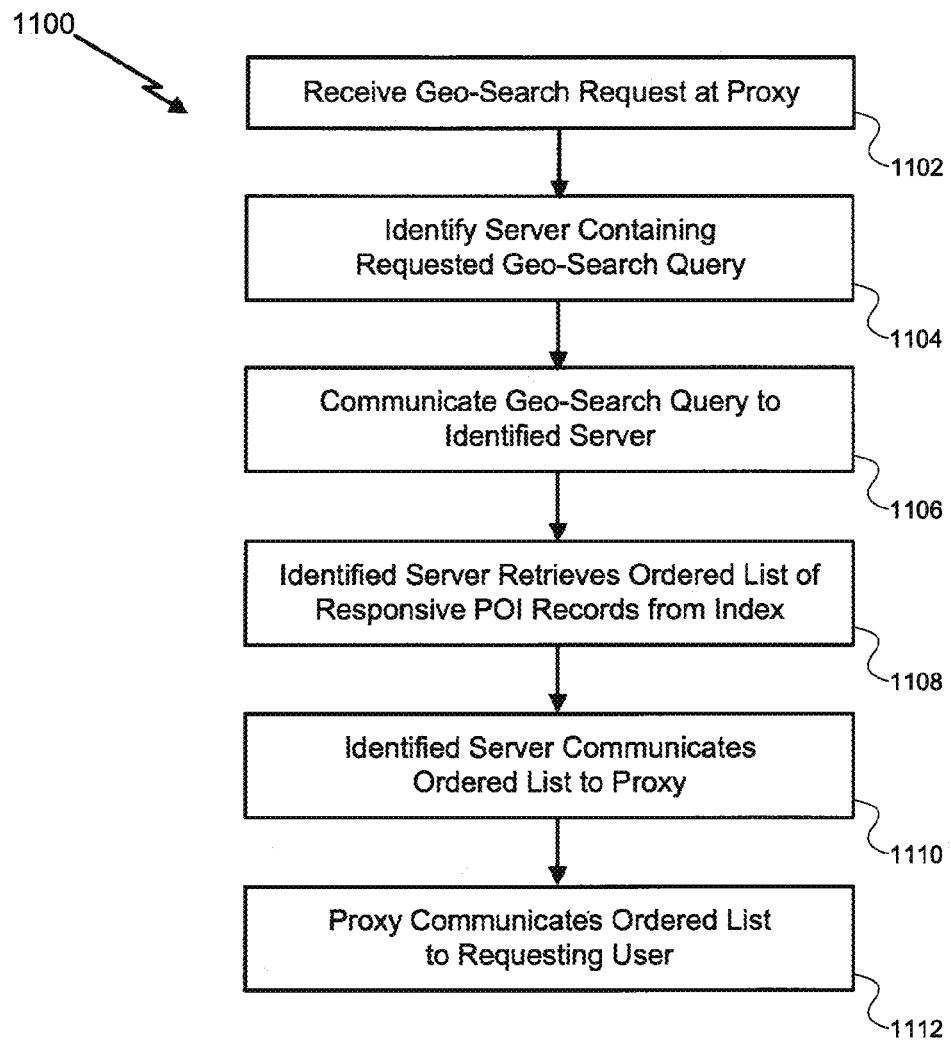
FIG. 11 illustrates a method for responding to a geo-search query request using a Partition-by-Query index with portions stored at a plurality of servers.

FIG. 11 illustrates a method for responding to a geo-search query request using a Partition-by-Query index with portions stored at a plurality of servers, such as the plurality of servers shown in FIG. 3. In step 1102, a geo-search engine request in the form of a geo-search query is received, for example, at proxy 302. In step 1104, proxy 302 determines which server, if any, contains responsive data for that geo-search query. If proxy 302 determines that one of the servers contains responsive data, proxy 302 forwards the geo-search query to that single server in step 1106.

Notably, the geo-search query can be forwarded to a single server because proxy 302 knows the identity of the server containing results for the geo-search query based on a list of queries or a lexicographical range of queries for each server maintained by the proxy 302. This feature reduces network traffic within system 300 and improves the ability of system 300 to respond to large numbers of user requests.

In step 1108, the identified server receives the forwarded geo-search query from proxy 302 in a form consistent with a particular embodiment and retrieves an ordered list of responsive POI records from that server's corresponding portion of the Partition-by-Query index. In step 1110, the identified server sends the retrieved list to proxy 302.

In step 1112, proxy 302 forwards the ordered list of responsive POI records to the requesting user as part of responding to the requesting user's geo-search engine request. In some embodiments, proxy 302 may also format the ordered list of responsive POI records to make the list more visually pleasing to the requesting user. By this method, proxy 302 and the identified server interact to store and retrieve geo-search query results efficiently and at a rate that potentially exceeds the capacity of a single server to receive and process geo-search query results.

Using a MapReduce Capability to Generate the Index

As mentioned above, efficiencies can be realized by partitioning a POI record corpus into subsets, each of which is provided as the POI record corpus to the method as shown in FIGS. 10A, 10B, and 10C. In some embodiments, a subset may reflect a geographic group and in other embodiments, a subset may reflect POI records within a geographic group. The principles described herein also may be combined with a MapReduce framework and libraries to realize greater computational throughput. After each independent portion of the problem has been executed, the results from each independent execution may be combined to form a combined result reflecting the result that would have been generated by a single server executing the original problem.

In some embodiments of the present invention, a MapReduce capability can be utilized in conjunction with the method shown in FIGS. 10A, 10B, and 10C by splitting a POI record corpus into a plurality of subsets, as discussed above, executing steps 1002, 1004, 1006, 1008, 1010, 1012, 1014, 1016, 1018, 1020, and 1022 for each subset, and then combining results from each subset into a single data set prior to executing step 1024. Thereafter, steps 1024, 1026, 1028, 1030, and 1032 would in at least one embodiment be performed by a single server operating on a data set reflecting the results of all subsets. In this way, in some embodiments, a MapReduce capability would provide computational efficiencies and reduce the time to generate a Partition-by-Query index for POI records.

Figure 12:
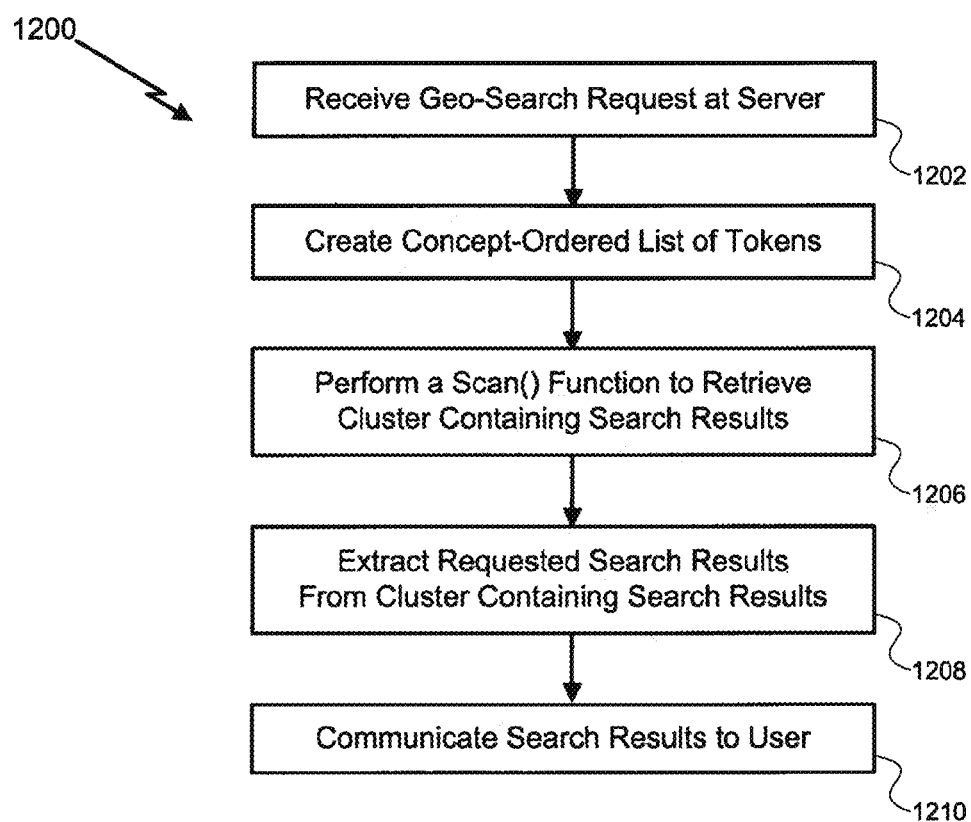
FIG. 12 illustrates a method for retrieving geo-search results from a Partition-by-Query index consistent with at least one embodiment.

FIG. 12 illustrates a method for retrieving geo-search results from a Partition-by-Query index consistent with at least one embodiment of the present invention. In step 1202, a server containing a partial or a full Partition-by-Query index receives a geo-search request from a user. In some embodiments, as discussed above in conjunction with FIG. 11, the user's geo-search request may be forwarded to a server from a proxy. In other embodiments not employing a proxy, a server may receive the geo-search request from a user without employing a proxy.

In step 1204, a concept-ordered list of geo-search tokens is created from the geo-search request received from the user in step 1202. As previously discussed, concept-ordered lists of tokens reorder tokens to place terms with low frequency in the POI record corpus first and to place tokens of increasing frequency in subsequent positions within the concept-ordered list. Additionally, as discussed above, some tokens such as articles may be removed from the geo-search request in some embodiments.

In step 1206, a scan( ) function is performed utilizing the concept-ordered list of tokens as an input to the scan( ) function. As previously discussed, the scan( ) function retrieves the first key-values pair following the key in the index where the concept-ordered list of tokens would exist. The values for the key-values pair retrieved by the scan( ) function is a cluster in some embodiments of the present invention. In other embodiments not employing clustering, the values retrieved may represent an ordered list of POI record references whose corresponding POI records may be presented as a geo-search result to the user.

In step 1208, for embodiments employing clustering, the key-values pair corresponding to the concept-ordered list of tokens within the cluster retrieved in step 1206 is retrieved from the cluster to form the list of references to POI records responsive to the geo-search request.

In step 1210, method 1200 concludes by communicating a message to the user comprising an ordered list of POI records responsive to the user's geo-search request. In some embodiments, if a single POI record is a complete match to the user's geo-search query (for example, when a user provided a geo-search query comprising a complete address for a point of interest), the single POI record is returned to the user and a list of prioritized POI records are returned to the user if no single POI record is a complete match to the user's geo-search query. In other embodiments, a list of prioritized POI records are returned to a user regardless of whether a single POI record is a complete match to the user's geo-search query.

Figure 13:
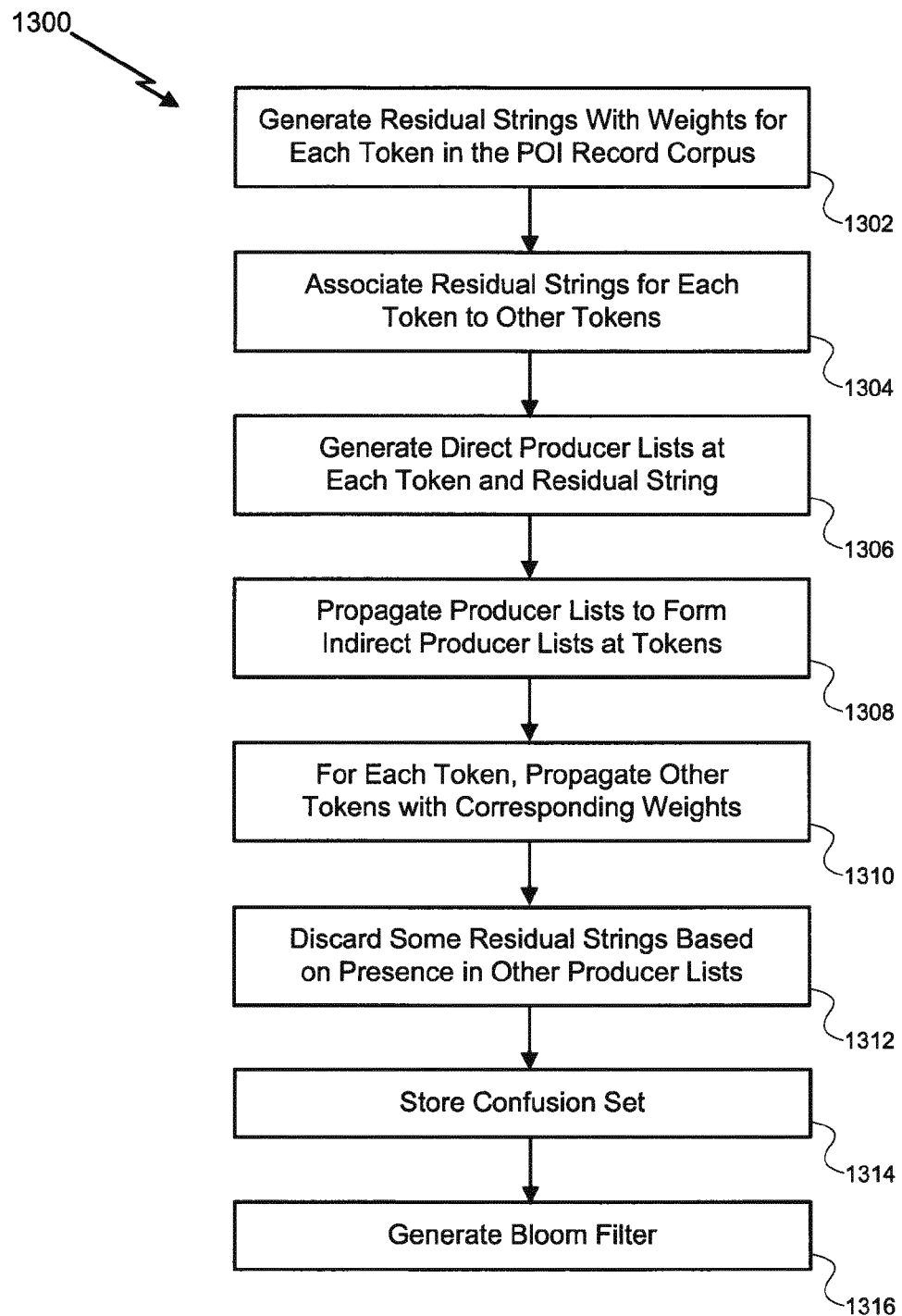
FIG. 13 illustrates a method for generating a geo-search confusion set consistent with at least one embodiment.

FIG. 13 illustrates a method 1300 for generating a geo-search confusion set consistent with at least one embodiment. In step 1302, residual strings with corresponding weights for each token in the POI record corpus are generated. Step 1304 creates associations between each token and residual strings associated with other tokens. In step 1306, a "producer list" is created for each token. As previously discussed in conjunction with FIG. 6, a producer list for a token comprises its residual strings and corresponding weights.

In step 1308, a producer list for each token is propagated to each residual string to form a "variation list" for that residual string. As discussed in conjunction with FIG. 8, the tokens in a variation list for a residual string provide suggestions and spelling corrections for that residual string and the number of character variations for each token in the variation list allows the suggestions and spelling corrections to be prioritized. In some embodiments, only tokens with less than a certain number of character variations are propagated to residual strings to form variation lists for those residual strings. For example, in at least one embodiment, only tokens with less than 5 character variations to a residual string are propagated to that residual string. In other embodiments, the number of allowable character variations may be greater than 5 or less than 5.

In step 1310, tokens in the POI record corpus and their corresponding weights are propagated to other tokens. In some embodiments, only tokens with corresponding weights below a certain limit are propagated to other tokens. For example, in at least one embodiment, only tokens with corresponding weights less than 5 are propagated to other tokens. In other embodiments, the limit may be greater than 5 or less than 5.

In step 1312, some redundant residual strings may be discarded. However, tokens and high-connectivity residual nodes are retained rather than removed during step 1312.

In step 1314, the propagated list of tokens with weights for each token and the variation list for each remaining residual string are stored as the confusion set for the POI record corpus. In step 1316, the method may conclude by creating a Bloom filter for the confusion set. Those skilled in the art will recognize how to create a Bloom filter. As discussed in conjunction with FIG. 14, a Bloom filter may be used to determine whether suggestions or spelling corrections exist for a current set of characters entered by a user into a geo-search engine user interface.

Figure 14:
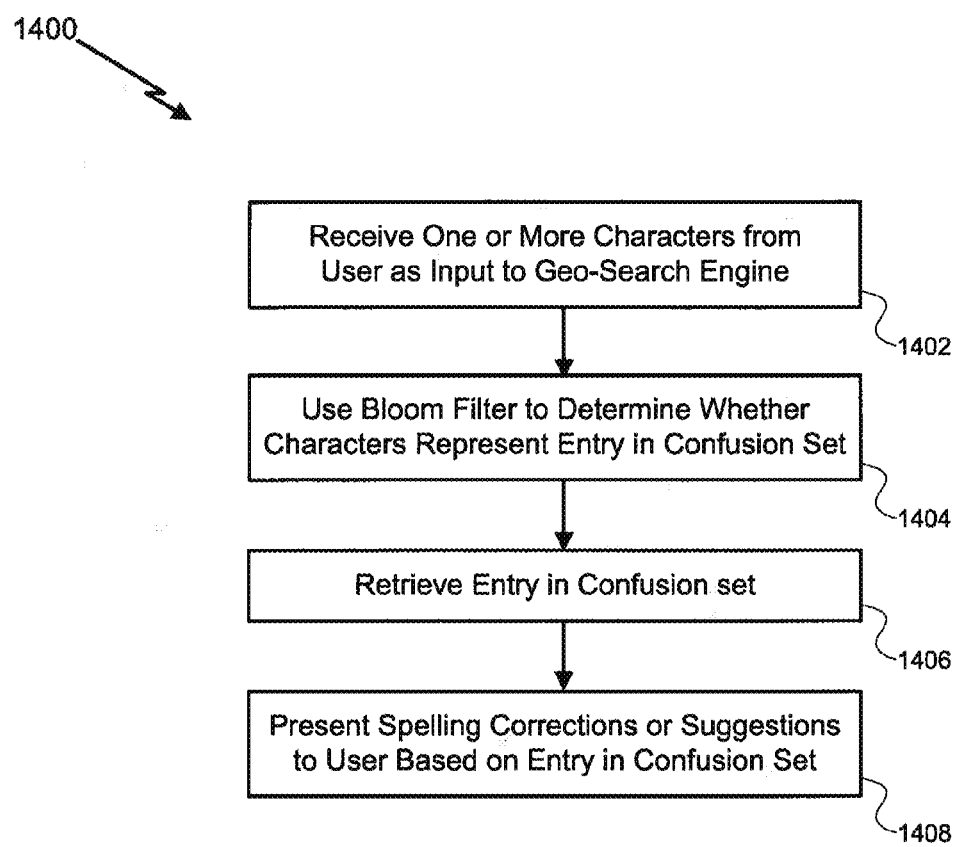
FIG. 14 illustrates a method for providing geo-search suggestions and spelling corrections to users based in part on a geo-search confusion set in at least one embodiment.

FIG. 14 illustrates an exemplary method 1400 for providing geo-search suggestions and spelling corrections to users based in part on a geo-search confusion set. In step 1402, a geo-search engine utilizing a confusion set receives one or more characters as input to the geo-search engine from a user. In some embodiments, each character entered by a user may be individually communicated to the geo-search engine. In other embodiments, upon a character being entered by the user, the geo-search engine may receive all characters that the user has entered for the current token or partial token as input to the geo-search engine.

In step 1404, the characters entered by the user for the current token or partial token are input to a Bloom filter and the Bloom filter determines whether those characters represent suggestions or spelling corrections for those characters in the confusion set. In step 1406, data representing suggestions or spelling corrections for the characters received from the user is retrieved from the confusion set if the Bloom filter determined that such data was present in the confusion set. In step 1408, method 1400 concludes by presenting the spelling corrections or suggestions in the data retrieved from the confusion set to the user as geo-search options.

Figure 15:
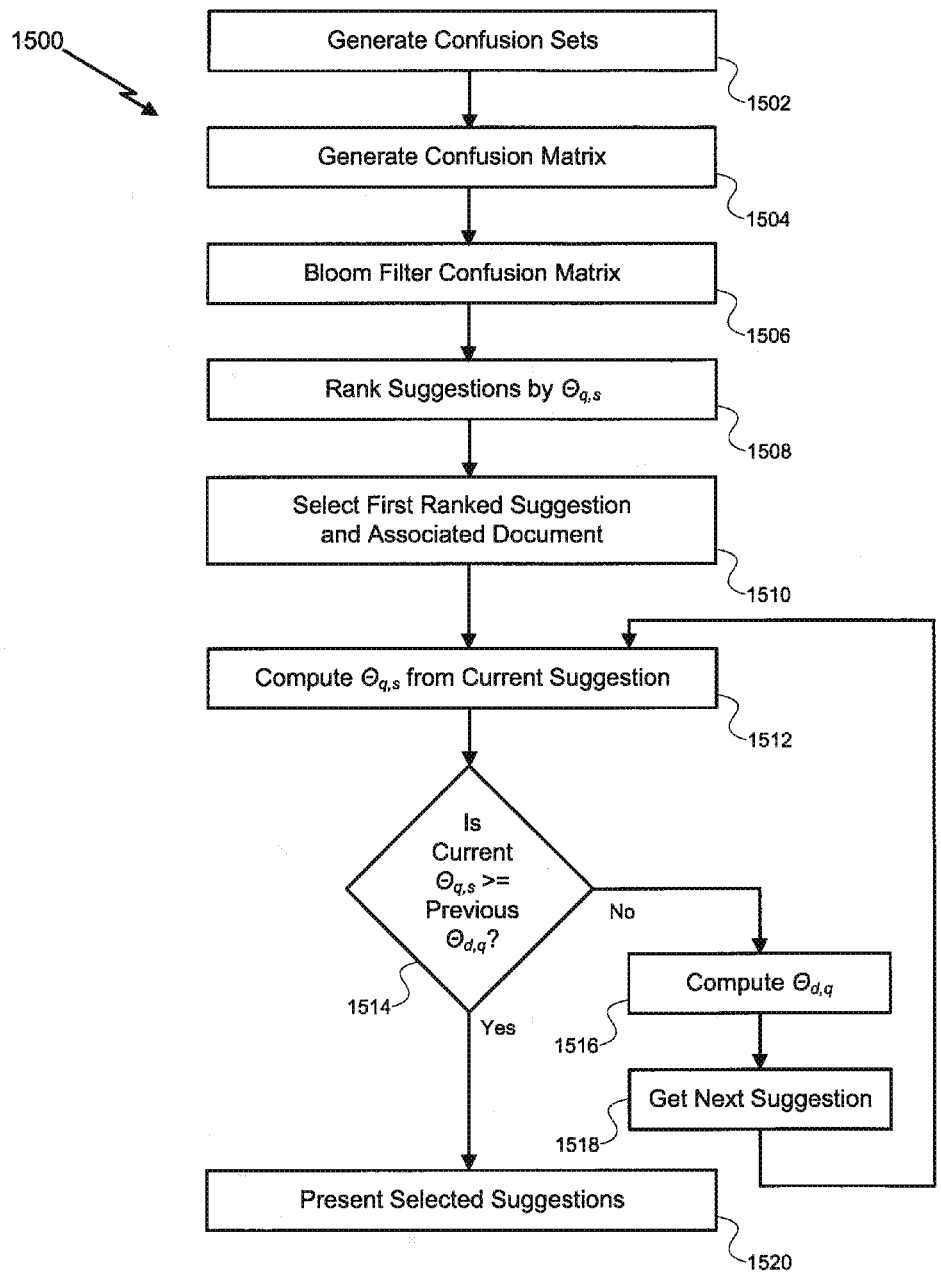
FIG. 15 illustrates a method applying the principles of the Triangle Inequality to identify one or more suggestions for a geo-search query.

FIG. 15 illustrates a method 1500 applying the principles of Triangle Inequality to identify one or more geo-search suggestions for a geo-search query. In step 1502, a confusion set is generated for each token in a geo-search query. In step 1504, a confusion matrix is generated from the confusion sets generated in step 1502. In step 1506, elements of the confusion matrix whose suggestions are not present in a POI record within a POI record corpus are removed from the confusion matrix. In step 1508, the remaining suggestions are ranked by their corresponding $\theta_{q,s}$ value. In step 1510, a first ranked suggestion is selected and its associated POI record is also selected. In step 1512, $\theta_{q,s}$ is computed for the current suggestion.

In step 1514, a determination is made whether $\theta_{q,s}$ for the current selected suggestion is greater than or equal to $\theta_{d,q}$ for a POI record associated with the previous selected suggestion. If step 1514 evaluates to false, the stopping criteria discussed above has not been met, so $\theta_{d,q}$ is determined for the POI record associated with the current selected suggestion in step 1516, a next selected suggestion is identified in step 1518, and the method returns to step 1512. If step 1514 evaluates to true, however, the stopping criteria discussed above has been met so the method concludes by presenting the selected suggestions to a user in step 1520.

As discussed above, method 1500 utilizes the principles of Triangle Inequality to select geo-search suggestions that are the most relevant to a user, based on a computed stopping criteria. This method may reduce the number of geo-search suggestions that a geo-search engine considers and therefore improve the responsiveness of the geo-search engine as perceived by a user.

In addition to the methods disclosed herein, systems may execute the method or may contain instructions that, when executed, perform the steps of the method. For example, a first computing device may comprise a processor and a memory, the memory storing instructions that, when executed, perform one or more of the above-disclosed methods. Additionally, a first computer-readable medium may comprise instructions that, when executed, perform one or more of the disclosed methods.

The foregoing discussion sets forth methods and systems for providing search query results utilizing a Partition-by-Query index. Although the method and system has been described in the context of a series of embodiments, those skilled in the art will readily recognize that the methods and systems suggest other embodiments without departing from the scope of the method and system.

The invention claimed is:

1. A method for configuring a search engine to provide spelling corrections or suggestions to search queries, the method comprising:
   generating, by a computing device, one or more residual strings associated with a first token in record corpus, wherein each of the one or more residual strings represents a variation of the first token and is associated with a first weight reflecting a degree of variation from the first token;
   generating, by the computing device, a first list associated with the first token, the first list comprising the one or more residual strings and the first weights associated with the one or more residual strings;
   generating, by the computing device, a second list associated with at least one of the one or more residual strings;
      wherein the second list comprises one or more second tokens;
      wherein each of the one or more second tokens represents a variation of the at least one of the one or more residual strings; and
      wherein each of the one or more second tokens is associated, in the second list, with a second weight reflecting a degree of variation from the at least one of the one or more residual strings; and
   generating, by the computing device, a third list associated with the first token, wherein the third list comprises the one or more second tokens;
      wherein at least one of the one or more second tokens is associated, in the third list, with a third weight reflecting a relationship between the first token and the at least one of one or more second tokens; and
      wherein the third weight is generated by a combination of the first weight and the second weight; and
   determining, by the computing device, a spelling correction or suggestion to the search query based on the one or more third weights.

2. The method of claim 1, wherein propagating tokens generating a third list further comprises discarding redundant residual strings.

3. The method of claim 2, further comprising the step of generating, by a computing device, a bloom filter.

4. An apparatus for providing geo-search engine suggestions to users, the apparatus comprising:
   at least one processor;
   a network connection; and
   a memory comprising instructions that, when executed by the at least one processor, perform the operations of:
   generating, by the at least one processor, one or more residual strings associated with a first token in a record corpus of point of interest records, wherein each point of interest record comprises a name and a location formed from tokens;
      wherein each of the one or more residual strings represents a variation of the first token and is associated with a first weight reflecting a degree of variation from the first token;
   generating, by the at least one processor, a first list associated with the first token, the first list comprising the one or more residual strings and the first weights associated with the one or more residual strings;
   generating, by the at least one processor, a second list associated with at least one of the one or more residual strings;
      wherein the second list comprises one or more second tokens;
      wherein each of the one or more second tokens represents a variation of the at least one of the one or more residual strings; and
      wherein each of the one or more second tokens is associated, in the second list, with a second weight reflecting a degree of variation from the at least one of the one or more residual strings; and
   generating, by the at least one processor, a third list associated with the first token, wherein the third list comprises the one or more second tokens;
      wherein at least one of the one or more second tokens is associated, in the third list, with a third weight reflecting a relationship between the first token and the at least one of one or more second tokens; and
      wherein the third weight is generated by a combination of the first weight and the second weight; and
   determining, by the at least one processor, a geo-search suggestion to a geo-search query for a point of interest based on the one or more third weights.

5. The apparatus of claim 4, wherein generating a third list further comprises discarding redundant residual strings.

6. The apparatus of claim 5, the memory further comprising instructions that, when executed, perform the step of generating a bloom filter.

7. A non-transitory computer-readable medium containing instructions that, when executed, perform a method comprising the steps of:
   generating, by at least one processor, one or more residual strings associated with a first token in a record corpus of point of interest records, wherein each point of interest record comprises a name and a location formed from tokens;
      wherein each of the one or more residual strings represents a variation of the first token and is associated with a first weight reflecting a degree of variation from the first token;
   generating, by the at least one processor, a first list associated with the first token, the first list comprising the one or more residual strings and the first weights associated with the one or more residual strings;
   generating, by the at least one processor, a second list associated with at least one of the one or more residual strings;

wherein the second list comprises one or more second tokens;

wherein each of the one or more second tokens represents a variation of the at least one of the one or more residual strings; and wherein each of the one or more second tokens is associated, in the second list, with a second weight reflecting a degree of variation from the at least one of the one or more residual strings; and generating, by the at least one processor, a third list associated with the first token, wherein the third list comprises the one or more second tokens;

wherein at least one of the one or more second tokens is associated, in the third list, with a third weight reflecting a relationship between the first token and the at least one of one or more second tokens; and wherein the third weight is generated by a combination of the first weight and the second weight; and determining, by the at least one processor, a geo-search suggestion to a geo-search query for a point of interest based on the one or more third weights.

8. The non-transitory computer-readable medium of claim 7, wherein generating a third list further comprises discarding redundant residual strings.

9. The non-transitory computer-readable medium of claim 8 further containing instructions that, when executed, perform a step of generating a bloom filter.

* * * * *